United States Patent
Yonaha et al.

(10) Patent No.: US 8,169,501 B2
(45) Date of Patent: May 1, 2012

(54) OUTPUT APPARATUS, OUTPUT METHOD AND PROGRAM

(75) Inventors: Makoto Yonaha, Tokyo (JP); Haomin Jin, Tokyo (JP); Takayuki Udagawa, Kanagawa (JP)

(73) Assignee: Fujifilm Corporation, Tokyo (JE)

( * ) Notice: Subject to any disclaimer, the term of this patent is extended or adjusted under 35 U.S.C. 154(b) by 400 days.

(21) Appl. No.: 12/517,778

(22) PCT Filed: Dec. 5, 2007

(86) PCT No.: PCT/JP2007/073898
§ 371 (c)(1),
(2), (4) Date: Jun. 4, 2009

(87) PCT Pub. No.: WO2008/069344
PCT Pub. Date: Jun. 12, 2008

(65) Prior Publication Data
US 2010/0026871 A1    Feb. 4, 2010

(30) Foreign Application Priority Data
Dec. 5, 2006    (JP) ................................. 2006-328718

(51) Int. Cl.
*H04N 5/228* (2006.01)
(52) U.S. Cl. .................................................. 348/222.1
(58) Field of Classification Search .................. 348/142, 348/222.1
See application file for complete search history.

(56) References Cited

U.S. PATENT DOCUMENTS

| | | | |
|---|---|---|---|
| 6,445,409 B1 | 9/2002 | Ito et al. | |
| 7,075,567 B2 * | 7/2006 | Hunter et al. | ........... 348/208.13 |
| 7,375,744 B2 * | 5/2008 | Ono | .......................... 348/211.99 |
| 2002/0051057 A1 * | 5/2002 | Yata | ............................. 348/142 |
| 2005/0018049 A1 | 1/2005 | Falk | |
| 2006/0012681 A1 | 1/2006 | Fujii | |

(Continued)

FOREIGN PATENT DOCUMENTS

EP    0 977 437 A2    2/2000
(Continued)

OTHER PUBLICATIONS

Chinese Office Action, dated Oct. 12, 2010, for Chinese Application No. 200780045180.3.

(Continued)

*Primary Examiner* — James Hannett
(74) *Attorney, Agent, or Firm* — Birch, Stewart, Kolasch & Birch, LLP

(57) ABSTRACT

There is provided an output apparatus which is capable of outputting a moving image in such a manner as to enable an observer to easily judge whether a quick movement made by a suspicious individual is an abnormal behavior. The output apparatus includes a moving image obtaining section that obtains a moving image, an output section that outputs the moving image obtained by the moving image obtaining section, a condition storing section that stores thereon a condition to be satisfied by an object which is required to be extracted from a moving image, and an output control section that, when an object satisfying the condition is extracted from the moving image obtained by the moving image obtaining section, controls the moving image obtained by the moving image obtaining section in terms of a play back state in which the moving image is to be played back, and causes the output section to output the controlled moving image.

24 Claims, 11 Drawing Sheets

U.S. PATENT DOCUMENTS

| | | |
|---|---|---|
| 2006/0104609 A1 | 5/2006 | Ohmori et al. |
| 2006/0136597 A1* | 6/2006 | Shabtai et al. ................ 709/231 |
| 2006/0198611 A1 | 9/2006 | Park |
| 2006/0225120 A1 | 10/2006 | Lee et al. |

FOREIGN PATENT DOCUMENTS

| | | |
|---|---|---|
| EP | 1429334 A2 | 6/2004 |
| EP | 1622107 A1 | 2/2006 |
| JP | 11-308601 A | 11/1999 |
| JP | 2000-105835 A | 4/2000 |
| JP | 2000-222027 A | 8/2000 |
| JP | 2002-42139 A | 2/2002 |
| JP | 2002-135759 A | 5/2002 |
| JP | 2003-274257 A | 9/2003 |
| JP | 2004-194200 A | 7/2004 |
| JP | 2004-200989 A | 7/2004 |
| JP | 2006-33224 A | 2/2006 |

OTHER PUBLICATIONS

European Search Report, Sep. 27, 2010.

* cited by examiner

| SHAPE | COLOR | POSITION | DIRECTION | TYPE | MOVING PATTERN |
|---|---|---|---|---|---|
| SHAPE 1 | COLOR RANGE 1 | POSITION RANGE 1 | ANGLE RANGE 1 | TYPE 1 | MOVING PATTERN 1 |
| SHAPE 2 | COLOR RANGE 2 | POSITION RANGE 2 | ANGLE RANGE 2 | TYPE 2 | MOVING PATTERN 2 |
| ... | ... | ... | ... | ... | ... |
| SHAPE n | COLOR RANGE n | POSITION RANGE n | ANGLE RANGE n | TYPE n | MOVING PATTERN n |

| | |
|---|---|
| NUMBER OF SATISFYING OBJECTS 1 | SP1 |
| NUMBER OF SATISFYING OBJECTS 2 | SP2 |
| ⋮ | ⋮ |
| NUMBER OF SATISFYING OBJECTS m | SPm |
| SHAPE 1 | SPa |
| SHAPE 2 | SPb |
| ⋮ | ⋮ |
| SHAPE n | SPn |
| COLOR RANGE 1 | SPa |
| COLOR RANGE 2 | SPb |
| ⋮ | ⋮ |
| COLOR RANGE n | SPx |
| POSITION RANGE 1 | SPa |
| POSITION RANGE 2 | SPb |
| ⋮ | ⋮ |
| POSITION RANGE n | SPx |
| ANGLE RANGE 1 | SPa |
| ANGLE RANGE 2 | SPb |
| ⋮ | ⋮ |
| ANGLE RANGE n | SPx |
| TYPE 1 | SPa |
| TYPE 2 | SPb |
| ⋮ | ⋮ |
| TYPE n | SPx |
| MOVING PATTERN 1 | SPa |
| MOVING PATTERN 2 | SPb |
| ⋮ | ⋮ |
| MOVING PATTERN n | SPx |

NUMBER OF SATISFYING OBJECTS 1 > NUMBER OF SATISFYING OBJECTS 2 > ··· > NUMBER OF SATISFYING OBJECTS m

SP1 > SP2 > ··· > SPm

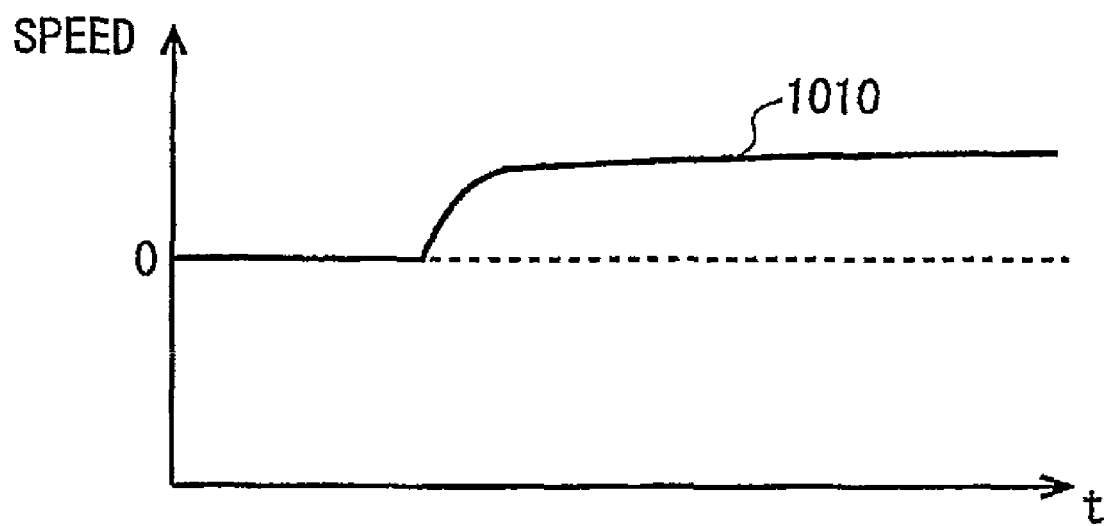
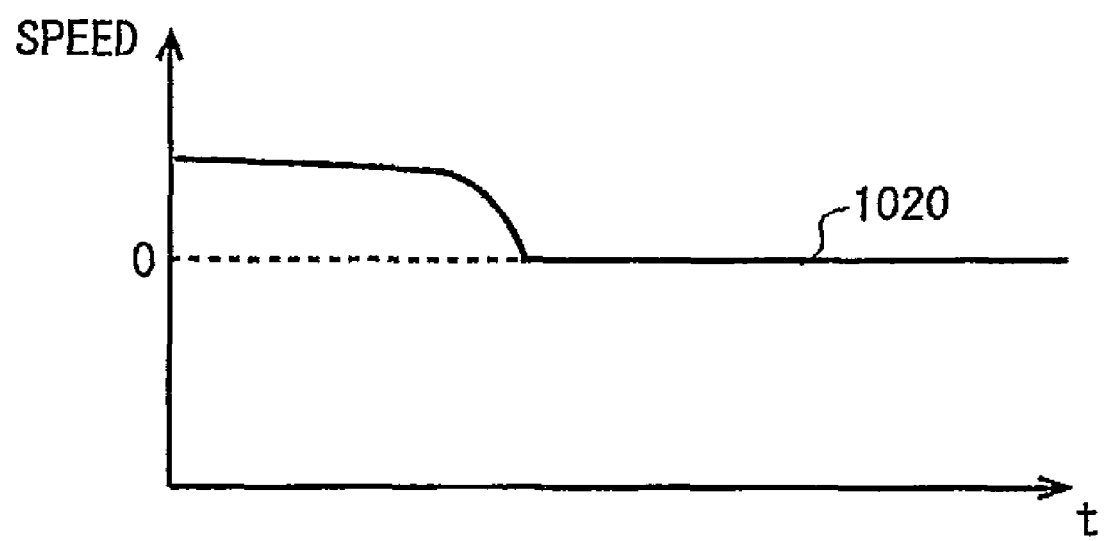
FIG. 10

OUTPUT APPARATUS, OUTPUT METHOD AND PROGRAM

TECHNICAL FIELD

The present invention relates to an output apparatus, an output method and a program. More particularly, the present invention relates to an output apparatus and an output method for outputting images, and a program for use with an output apparatus. This patent application incorporates herein by reference the contents of Japanese Patent Application No. 2006-328718 filed on Dec. 5, 2006, if applicable.

BACKGROUND ART

According to a known image capturing apparatus, a moving image compressing section detects a motion vector. During a period in which the detected motion vector indicates a value less than a predetermined value, the image capturing apparatus decreases the frame rate for the image capturing performed by an image capturing section by designating a relatively long time period as the period of the synchronous signal supplied to the image capturing section. On the other hand, during a period in which the detected motion vector indicates a value equal to or higher than the predetermined value, the image capturing apparatus increases the frame rate for the image capturing by designating a relatively short time period as the period of the synchronous signal. See Patent Document 1, for example.

[Patent Document 1] Unexamined Japanese Patent Application Publication No. 2004-200989

DISCLOSURE OF THE INVENTION

Problems to be Solved by the Invention

The image capturing apparatus disclosed in the above-mentioned Patent Document 1 captures images at a low frame rate while no movement is detected. When detecting a movement corresponding to the predetermined value or higher in the captured images, the image capturing apparatus increases the frame rate. Having such a configuration, the image capturing apparatus can record a movement made by a suspicious individual with a high temporal resolution. However, when the suspicious individual makes a very quick movement, an observer who observes the images captured by the image capturing apparatus may not be able to judge whether the movement of the suspicious individual is abnormal or not since the suspicious individual moves too fast. If such occurs, the observer must replay the images in order to check the movement of the suspicious individual. While doing this, the observer may allow the suspicious individual to run away.

In view of the above, an object of the present invention is to provide an output apparatus, an output method and a program which can solve the above-mentioned problem. This object is achieved by combining the features recited in the independent claims. The dependent claims define further effective specific example of the present invention.

Means for Solving the Problems

To solve the above-mentioned problem, a first embodiment of the present invention provides an output apparatus including a moving image obtaining section that obtains a moving image, an output section that outputs the moving image obtained by the moving image obtaining section, a condition storing section that stores thereon a condition to be satisfied by an object which is required to be extracted from a moving image, and an output control section that, when an object satisfying the condition is extracted from the moving image obtained by the moving image obtaining section, controls the moving image obtained by the moving image obtaining section in terms of a play back state in which the moving image is to be played back, and causes the output section to output the controlled moving image. The condition storing section may store thereon a condition which is related to a movement of the object required to be extracted from the moving image, and when an object satisfying the condition related to the movement is extracted from the moving image obtained by the moving image obtaining section, the output control section may control the moving image obtained by the moving image obtaining section in terms of the play back state in which the moving image is to be played back, and cause the output section to output the controlled moving image. The output apparatus may further include a counting section that counts the number of objects, in the moving image obtained by the moving image obtaining section, which satisfy the condition, and the output control section may convert the moving image obtained by the moving image obtaining section into a different moving image in such a manner that a play back speed at which the different moving image is to be played back decreases as the number of objects which is counted by the counting section increases, and cause the output section to output the different moving image generated as a result of the conversion. The output apparatus may further include a play back speed information storing section that stores thereon play back speeds in association with the numbers of objects, and a play back speed selecting section that selects a play back speed which is stored on the play back speed information storing section in association with the number of objects which is counted by the counting section, and the output control section may convert the moving image obtained by the moving image obtaining section into a moving image which is to be played back at the play back speed selected by the play back speed selecting section, and cause the output section to output the moving image generated as a result of the conversion.

The condition storing section may store thereon a condition which designates a range in which the object required to be extracted from the moving image is positioned, and the counting section may count the number of objects, in the moving image obtained by the moving image obtaining section, which are positioned within the range designated by the condition. The condition storing section may store thereon a condition which designates a shape of the object required to be extracted from the moving image, and the counting section may count the number of objects, in the moving image obtained by the moving image obtaining section, which have the shape designated by the condition. The condition storing section may store thereon a condition which designates a color range including a color which is present in the object required to be extracted from the moving image, and the counting section may count the number of objects, in the moving image obtained by the moving image obtaining section, which have the color included in the color range designated by the condition. The condition storing section may store thereon a condition which designates a type to which the object required to be extracted from the moving image belong, and the counting section may count the number of objects, in the moving image obtained by the moving image obtaining section, which belong to the type designated by the condition. The condition storing section may store thereon a condition which designates a moving direction in which the object required to be extracted from the moving image moves, and the counting section may count the number of objects, in the moving image obtained by the moving image obtaining section, which move in the moving direction designated by the condition.

The moving image obtaining section may obtain a moving image which is captured by an image capturing apparatus, the condition storing section may store thereon a condition which designates a moving direction towards the image capturing apparatus, and the counting section may count the number of objects, in the moving image obtained by the moving image obtaining section, which move in the moving direction designated by the condition. The output section may display thereon the moving image obtained by the moving image obtaining section, and after causing the output section to display thereon the moving image obtained by the moving image obtaining section at a play back speed lower than a specified play back speed which is specified for the moving image obtained by the moving image obtaining section, the output control section may convert a moving image captured during a period in which the number of objects counted by the counting section is smaller than a predetermined number into a moving image which is to be played back at a play back speed higher than the specified play back speed and cause the output section to output the moving image generated as a result of the conversion, so that an averaged play back speed from when the output section is caused to start displaying thereon the moving image obtained by the moving image obtaining section becomes substantially equal to the specified play back speed.

The output apparatus may further include a behavior detecting section that detects a behavior of an observer which is required to observe the moving image obtained by the moving image obtaining section, the output section may display the moving image obtained by the moving image obtained section, and the output control section may further control the display of the moving image which is achieved by the output section based on the behavior of the observer which is detected by the behavior detecting section. The output apparatus may further include a behavior judging section that judges whether the observer observes the moving image displayed by the output section based on the behavior of the observer which is detected by the behavior detecting section, and the output control section may control the display of the moving image which is achieved by the output section based on the judgment made by the behavior judging section. The output control section may cause the output section to display the moving image again, when the judgment made by the behavior judging section indicates that the observer does not observe the moving image displayed on the output section. The behavior detecting section may include a line of vision detecting section that detects a line of vision of the observer, and a line of vision judging section that judges whether the line of vision which is detected by the line of vision detecting section extends towards the output section, and the behavior judging section may judge that the observer does not observe the moving image displayed by the output section, when the line of vision judging section judges that the line of vision which is detected by the line of vision detecting section does not extend towards the output section.

The output apparatus may further include a behavior judging section that judges whether the observer observes the moving image displayed by the output section based on the behavior of the observer which is detected by the behavior detecting section, and a warning section that issues a warning to the observer when the judgment made by the behavior judging section indicates that the observer does not observe the moving image displayed by the output section. The behavior detecting section may include a line of vision detecting section that detects a line of vision of the observer, and a line of vision judging section that judges whether the line of vision which is detected by the line of vision detecting section extends towards the output section, and when the line of vision judging section judges that the line of vision which is detected by the line of vision detecting section does not extend towards the output section, the behavior judging section may judge that the observer does not observe the moving image displayed by the output section.

The moving image obtaining section may obtain a plurality of moving images captured by different image capturing apparatuses, and the output control section may include a moving image selecting section that selects a moving image which is required to be controlled in terms of a play back state in which the moving image is to be played back, based on how each of the different image capturing apparatuses is positioned relative to a subject indicated by the object satisfying the condition, and a play back state control section that controls the moving image selected by the moving image selecting section in terms of the play back state in which the moving image is to be played back. The moving image selecting section may select the moving image which is required to be controlled in terms of the play back state in which the moving image is to be played back, based on a distance between each of the different image capturing apparatuses and the subject indicated by the object satisfying the condition. The moving image selecting section may select the moving image which is required to be controlled in terms of the play back state in which the moving image is to be played back, based on an image capturing direction of each of the different image capturing apparatuses and a direction the subject indicated by the object satisfying the condition faces.

The condition storing section may store thereon a condition which designates a direction in which the object required to be extracted from the moving image moves, the output apparatus may further include a satisfaction judging section that judges whether an object which moves in the direction designated by the condition is present in the moving image obtained by the moving image obtaining section, and when the satisfaction judging section judges positively, the output control section may convert the moving image obtained by the moving image obtaining section into a moving image which is to be played back at a lower play back speed than when the satisfaction judging section judges negatively, and cause the output section to output the moving image generated as a result of the conversion. The output apparatus may further include a play back speed information storing section that stores thereon a play back speed in association with the direction designated by the condition, and a play back speed selecting section that, when the satisfaction judging section judges positively, selects the play back speed which is stored on the play back speed information storing section in association with the direction designated by the condition. Here, the output control section may convert the moving image obtained by the moving image obtaining section into a moving image which is to be played back at the play back speed which is selected by the play back speed selecting section, and cause the output section to output the moving image generated as a result of the conversion.

The output section may display thereon the moving image obtained by the moving image obtained section, and after causing the output section to display thereon the moving image obtained by the moving image obtaining section at a play back speed lower than a specified play back speed which is specified for the moving image obtained by the moving image obtaining section, the output control section may convert a moving image captured during a period in which the satisfaction judging section judges negatively into a different moving image which is to be played back at a play back speed higher than the specified play back speed, and cause the output section to output the different moving image generated as a result of the conversion, so that an averaged play back speed from when the output section is caused to start displaying thereon the moving image obtained by the moving image obtaining section becomes substantially equal to the specified play back speed. The condition storing section may store thereon a condition which designates a type to which the object required to be extracted from the moving image belongs. Here, the output apparatus may further include a play back speed information storing section that stores thereon a play back speed in association with the type which is designated by the condition, and a satisfaction judging section that judges whether an object belonging to the type designated by the condition is present in the moving image obtained by the moving image obtaining section, and when the satisfaction judging section judges positively, the output control section may convert the moving image obtained by the moving image obtaining section into a moving image which is to be played back at a play back speed determined in accordance with the play back speed stored on the play back speed information storing section in association with the type designated by the condition, and cause the output section to output the moving image generated as a result of the conversion.

The condition storing section may store thereon a plurality of conditions which respectively designate a plurality of types to which objects required to be extracted from a moving image belong, the play back speed information storing section may store thereon a plurality of play back speeds in association with the plurality of types which are designated by the plurality of conditions, and when the satisfaction judging section judges that objects belonging to the plurality of types designated by the plurality of conditions are present in the moving image obtained by the moving image obtaining section, the output control section may convert the moving image obtained by the moving image obtaining section into a moving image which is to be played back at an average play back speed among the plurality of play back speeds which are stored on the play back speed information storing section in association with the plurality of types designated by the plurality of conditions, and cause the output section to output the moving image generated as a result of the conversion. The condition storing section may store thereon a plurality of conditions which respectively designate a plurality of types to which objects required to be extracted from a moving image belong, the play back speed information storing section may store thereon a plurality of play back speeds in association with the plurality of types designated by the plurality of conditions, and when the satisfaction judging section judges that objects belonging to the plurality of types designated by the plurality of conditions are present in the moving image obtained by the moving image obtaining section, the output control section may convert the moving image obtained by the moving image obtaining section into a moving image which is to be played back at the lowest play back speed among the plurality of play back speeds which are stored on the play back speed information storing section in association with the plurality of types designated by the plurality of conditions, and cause the output section to output the moving image generated as a result of the conversion.

The output section may display thereon the moving image obtained by the moving image obtaining section, and after causing the output section to display thereon the moving image obtained by the moving image obtaining section at a play back speed lower than a specified play back speed which is specified for the moving image obtained by the moving image obtaining section, the output control section may convert a moving image captured during a period in which the satisfaction judging section judges negatively into a different moving image which is to be played back at a play back speed higher than the specified play back speed, and cause the output section to output the different moving image generated as a result of the conversion, so that an averaged play back speed from when the output section is caused to start displaying thereon the moving image obtained by the moving image obtaining section becomes substantially equal to the specified play back speed.

A second embodiment of the present invention provides an output method including obtaining a moving image, storing a condition to be satisfied by an object which is required to be extracted from a moving image, and when an object satisfying the condition is extracted from the moving image obtained in the moving image obtaining, controlling the moving image obtained in the moving image obtaining in terms of a play back state in which the moving image is to be played back, and outputting the controlled moving image. A third embodiment of the present invention provides a program for use with an output apparatus that outputs a moving image. The program causes the output apparatus to function as a moving image obtaining section that obtains a moving image, an output section that outputs the moving image obtained by the moving image obtaining section, a condition storing section that stores thereon a condition to be satisfied by an object which is required to be extracted from a moving image, and an output control section that, when an object satisfying the condition is extracted from the moving image obtained by the moving image obtaining section, controls the moving image obtained by the moving image obtaining section in terms of a play back state in which the moving image is to be played back, and causes the output section to output the controlled moving image.

Here, all the necessary features of the present invention are not listed in the summary. The sub-combinations of the features may become the invention.

Effect of the Invention

The present invention can provide an output apparatus which is capable of outputting a moving image showing a suspicious individual which enables a monitoring person to easily judge whether a quick movement made by the suspicious individual is abnormal or not.

BRIEF DESCRIPTION OF THE DRAWINGS

FIG. 4 illustrates, as an example, a condition stored on a condition storing section 210.

FIG. 5 illustrates an example of play back speed information stored on a play back speed information storing section 250.

FIG. 10 illustrates, as an example, variations over time in an object moving speed, which satisfy the condition stored on the condition storing section 210.

BEST MODE FOR CARRYING OUT THE INVENTION

Hereinafter, an embodiment of the present invention will be described. The embodiment does not limit the invention according to the claims, and all the combinations of the features described in the embodiment are not necessarily essential to means provided by aspects of the invention.

Figure 1:
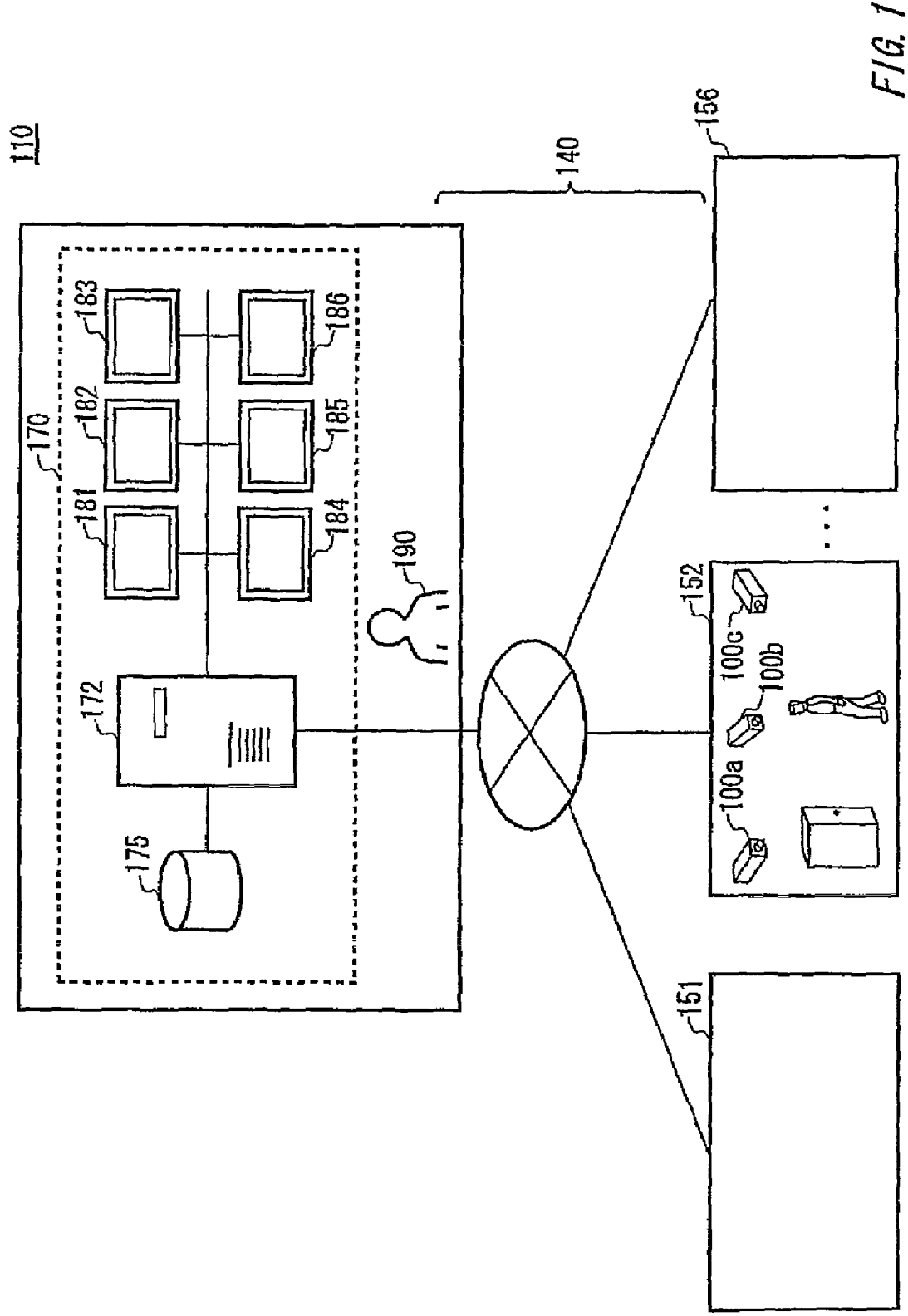
FIG. 1 illustrates an exemplary environment in which a monitoring system 110 is used.

FIG. 1 illustrates an exemplary environment in which a monitoring system 110 relating to an embodiment is used. The monitoring system 110 includes therein a plurality of image capturing apparatuses 100a to 100c, a transmission path 140, and an output apparatus 170. The output apparatus 170 includes therein an output control apparatus 172, a plurality of monitors 181 to 186, and a storage device 175. Here, the set of image capturing apparatuses 100a to 100c is provided in each of a plurality of monitored areas 151 to 156 to capture the images of a corresponding one of the plurality of monitored areas 151 to 156. Hereinafter, the sets of image capturing apparatuses 100a to 100c provided in the plurality of monitored areas 151 to 156 are collectively referred to as the image capturing apparatuses 100.

The image capturing apparatuses 100 capture moving images of the monitored areas 151 to 156, and transmit the captured moving images to the output apparatus 170 via the transmission path 140. The output control apparatus 172 causes the monitors 181 to 186 to display thereon the moving images received from the image capturing apparatuses 100. Here, each of the monitors 181 to 186 displays thereon a corresponding one of the moving images of the monitored areas 151 to 156.

The output control apparatus 172 counts the number of faces of people included in each of the moving images received from the image capturing apparatuses 100. As the number of faces of people increases, the output control apparatus 172 decreases the play back speed for each of the moving images received from the image capturing apparatuses 100, and causes each moving image to be displayed on a corresponding one of the monitors 181 to 186 at the decreased play back speed. While any of the moving images received from the image capturing apparatuses 100 is displayed at such a lower play back speed, the output control apparatus 172 issues a warning in a case where the line of vision of an observer 190 is not directed towards a corresponding one of the monitors 181 to 186 at which the play back speed is decreased.

When causing the monitors 181 to 186 to display thereon moving images, which are captured by the image capturing apparatuses 100 during a given period, at a play back speed lower than a specified play back speed which is specified for the moving images, the output control apparatus 172 causes the monitors 181 to 186 to display thereon moving images captured during a period later than the given period at a play back speed equal to or higher than the specified play back speed, under the condition that no person is included in the moving images captured during the later period. For example, the output control apparatus 172 causes each of the monitors 181 to 186 to display thereon a plurality of moving-image making-up images included in the moving image captured by a corresponding one of the image capturing apparatuses 100 at a display rate which is equal to or higher than the image capturing rate of the moving image. Here, the output control apparatus 172 may cause the storage device 175 to store thereon the moving images received from the image capturing apparatuses 100. In this case, the output control apparatus 172 may reduce the play back speed at which each of the moving images received from the image capturing apparatuses 100 is to be played back as the counted number of faces of people increases, and cause the storage device 175 to store thereon each moving image whose play back speed has been reduced.

As described above, the output control apparatus 172 decreases the play back speed as the number of people increases. Therefore, the observer 190 can easily judge whether the image-captured people are suspicious or not. Here, the monitored areas 151 to 156 may be spaces within different buildings, or different spaces within the same building. For example, the monitored areas 151 to 156 may be aisles between the shelves in a shop. The monitored areas 151 to 156 are not limited to the spaces within buildings, but may be open spaces which are not enclosed.

Figure 2:
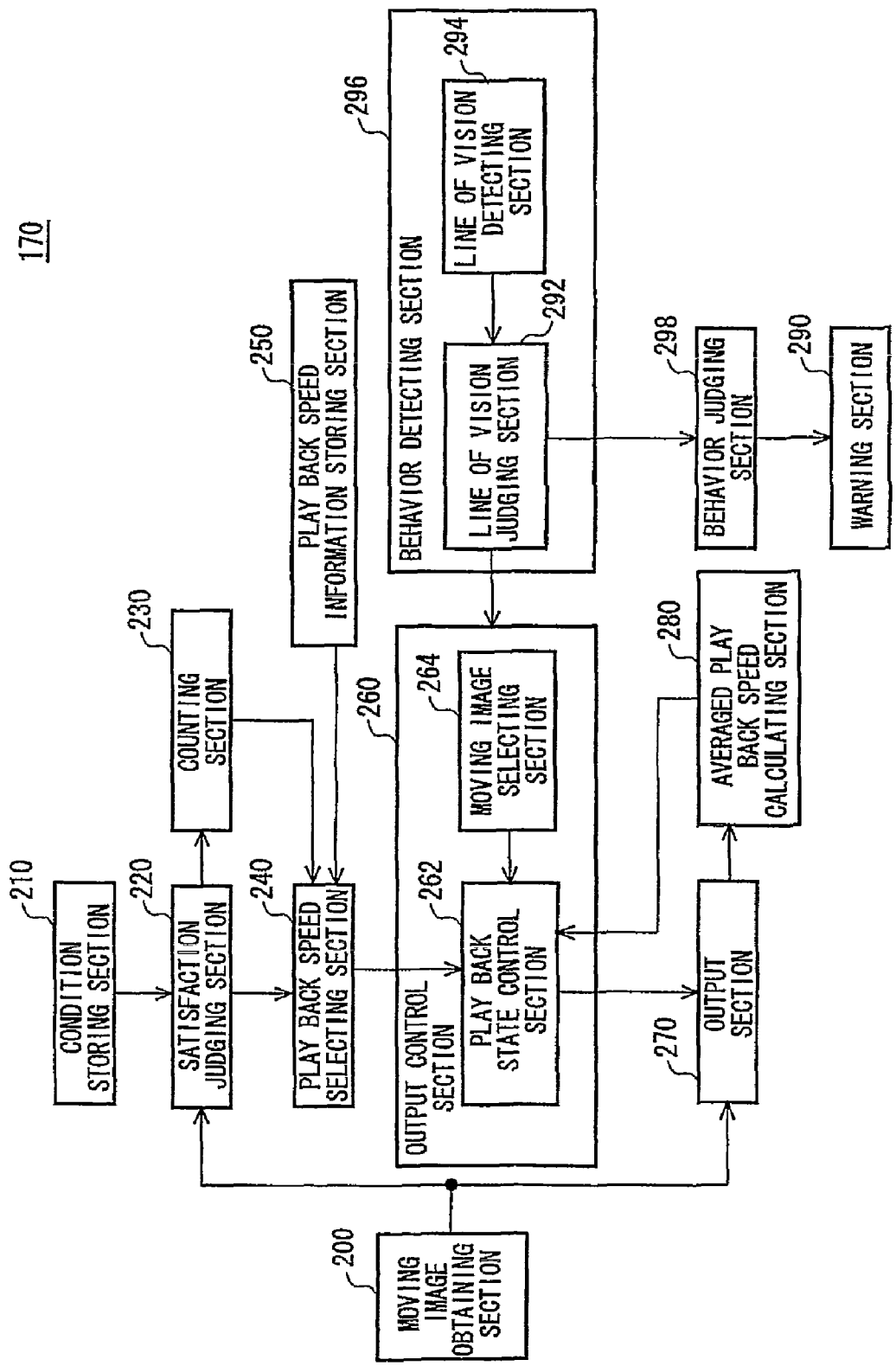
FIG. 2 illustrates an exemplary block configuration of an output apparatus 170.

FIG. 2 illustrates an exemplary block configuration of the output apparatus 170. The output apparatus 170 includes therein a moving image obtaining section 200, a condition storing section 210, a satisfaction judging section 220, a counting section 230, a play back speed play back speed selecting section 240, a play back speed information storing section 250, an output control section 260, an output section 270, an averaged play back speed calculating section 280, a warning section 290, a behavior detecting section 296, and a behavior judging section 298. The output control section 260 includes therein a play back state control section 262 and a moving image selecting section 264. The behavior detecting section 296 includes therein a line of vision judging section 292 and a line of vision detecting section 294.

The moving image obtaining section 200 obtains a moving image. For example, the moving image obtaining section 200 obtains the moving images captured by the image capturing apparatuses 100 from the image capturing apparatuses 100 via the transmission path 140. The output section 270 outputs the moving images obtained by the moving image obtaining section 200. Note that the monitors 181 to 186 and storage device 175 are shown as an example of the output section 270.

The condition storing section 210 stores thereon a condition to be satisfied by an object which is required to be extracted from the moving image. When an object satisfying the condition is extracted from the moving image obtained by the moving image obtaining section 200, the output control section 260 controls the moving image obtained by the moving image obtaining section 200 in terms of the play back state in which the moving image is to be played back, and then causes the output section 270 to output the controlled moving image. For example, the condition storing section 210 stores thereon a condition which designates the movement of an object which is required to be extracted from the moving image. When an object satisfying the condition that designates the movement is extracted from the moving image obtained by the moving image obtaining section 200, the output control section 260 controls the moving image obtained by the moving image obtaining section 200 in terms of the play back state in which the moving image is to be played back, and causes the output section 270 to output the controlled moving image.

The counting section 230 counts the number of objects, included in the moving image obtained by the moving image obtaining section 200, which satisfy the condition stored on the condition storing section 210. The output control section 260 converts the moving image obtained by the moving image obtaining section 200 into a different moving image, and causes the output section 270 to output the different moving image generated as a result of the conversion. Here, as the number of objects which is counted by the counting section 230 increases, the output control section 260 decreases the play back speed at which the different moving image generated as a result of the conversion is to be played back.

To be specific, the play back speed information storing section 250 stores thereon the play back speed in association with the number of objects. The play back speed selecting section 240 selects the play back speed which is stored on the play back speed information storing section 250 in association with the number of objects which is counted by the counting section 230. The output control section 260 converts the moving image obtained by the moving image obtaining section 200 into a moving image which is to be played back at the play back speed selected by the play back speed selecting section 240, and causes the output section 270 to output the moving image generated as a result of the conversion.

The moving image obtaining section 200 may obtain the moving image captured by each of the image capturing apparatuses 100. The output section 270 displays thereon the moving image obtained by the moving image obtaining section 200. In this case, the condition storing section 210 may store thereon a condition which designates a moving direction extending towards each image capturing apparatus 100. The counting section 230 may count the number of objects, included in the moving image obtained by the moving image obtaining section 200, which move in the moving direction designated by the condition stored. Note that, after causing the output section 270 to display thereon the moving image obtained by the moving image obtaining section 200 at a play back speed lower than the specified play back speed which is specified for the moving image obtained by the moving image obtaining section 200, the output control section 260 converts a moving image captured during a period in which the number of objects counted by the counting section 230 is smaller than a predetermined number into a moving image which is to be played back at a play back speed higher than the specified play back speed so that the averaged play back speed from when the output control section 260 causes the output section 270 to start displaying thereon the moving image obtained by the moving image obtaining section 200 becomes substantially equal to the specified play back speed, and causes the output section 270 to output the moving image generated as a result of the conversion. Here, the specified play back speed may be the display rate of the moving image.

The behavior detecting section 296 detects the behavior of the observer 190 who is required to observe the moving image obtained by the moving image obtaining section 200. The output control section 260 further controls the display of the moving image which is achieved by the output section 270, in accordance with the behavior of the observer 190 which is detected by the behavior detecting section 296. To be specific, the behavior judging section 298 judges whether the observer 190 observes the moving image displayed by the output section 270 based on the behavior of the observer 190 which is detected by the behavior detecting section 296. Based on the judgment made by the behavior judging section 298, the output control section 260 controls the display of the moving image which is achieved by the output section 270. Specifically speaking, when the judgment made by the behavior judging section 298 indicates that the observer 190 does not observe the moving image displayed by the output section 270, the output control section 260 causes the output section 270 to display the moving image again.

Specifically speaking, the line of vision detecting section 294 detects the line of vision of the observer 190 who observes the moving image displayed on the output section 270. The line of vision judging section 292 judges whether the line of vision which is detected by the line of vision detecting section 294 extends towards the output section 270. When the line of vision judging section 292 judges that the line of vision detected by the line of vision detecting section 294 does not extend towards the output section 270, the behavior judging section 298 judges that the observer 190 does not observe the moving image displayed by the output section 270.

When the judgment made by the behavior judging section 298 indicates that the observer 190 does not observe the moving image displayed by the output section 270, the warning section 290 issues a warning to the observer 190. For example, when the line of vision judging section 292 judges that the line of vision detected by the line of vision detecting section 294 does not extend towards the output section 270, the warning section 290 issues a warning to the observer 190. With such a configuration, when detecting a change in the obtained moving image, the output apparatus 170 can issue a warning to encourage the observer 190 to watch a corresponding one or more of the monitors 181 to 186 in a case where the observer 190 looks at something different.

The condition storing section 210 may store thereon a condition which designates the direction in which an object required to be extracted from a moving image moves. The satisfaction judging section 220 judges whether there is an object which moves in the direction designated by the condition in the moving image obtained by the moving image obtaining section 200. When the satisfaction judging section 220 judges that there is an object which moves in the direction designated by the condition, the output control section 260 converts the moving image obtained by the moving image obtaining section 200 into a moving image which is to be played back at a lower play back speed than when the satisfaction judging section 220 judges that there is no object which moves in the direction designated by the condition, and causes the output section 270 to output the moving image generated as a result of the conversion. With such a configuration, when detecting a person who makes a movement in the monitored area, the output apparatus 170 can display the moving image at a slower rate so as to make it easy for the observer 190 to check the movement made by the person.

The play back speed information storing section 250 stores thereon a play back speed in association with a direction. When the satisfaction judging section 220 judges that there is an object moving in the direction designated by the condition, the play back speed selecting section 240 selects the play back speed stored on the play back speed information storing section 250 in association with the direction designated by the condition. The output control section 260 converts the moving image obtained by the moving image obtaining section 200 into a moving image which is to be played back at the play back speed selected by the play back speed selecting section 240, and causes the output section 270 to output the moving image generated as a result of the conversion.

The condition storing section 210 may store thereon a condition which designates the type of an object which is required to be extracted from the moving image. The play back speed information storing section 250 may store thereon a play back speed in association with an object type. The satisfaction judging section 220 judges whether there is an object belonging to the type designated by the condition in the moving image obtained by the moving image obtaining section 200. When the satisfaction judging section 220 judges that there is an object belonging to the type designated by the condition, the output control section 260 causes the output section 270 to output the moving image obtained by the moving image obtaining section 200 in accordance with the play back speed which is stored on the play back speed information storing section 250 in association with the type designated by the condition.

The condition storing section 210 may store thereon a plurality of conditions which respectively designate a plurality of types of objects which are required to be extracted from the moving images. The play back speed information storing section 250 stores thereon moving image play back speeds in association with the plurality of types of the objects. When the satisfaction judging section 220 judges that there are objects belonging to the plurality of types designated by the plurality of conditions in the moving image obtained by the moving image obtaining section 200, the output control section 260 converts the moving image obtained by the moving image obtaining section 200 into a moving image which is to be played back at the average play back speed which is calculated among the plurality of play back speeds which are stored on the play back speed information storing section 250 in association with the plurality of types, and causes the output section 270 to output the moving image generated as a result of the conversion. Alternatively, when the satisfaction judging section 220 judges that there are objects belonging to the plurality of types designated by the plurality of conditions in the moving image obtained by the moving image obtaining section 200, the output control section 260 may convert the moving image obtained by the moving image obtaining section 200 into a moving image which is to be played back at the lowest play back speed among the plurality of play back speeds which are stored on the play back speed information storing section 250 in association with the plurality of types, and cause the output section 270 to output the moving image generated as a result of the conversion.

Note that the moving image obtaining section 200 obtains a plurality of moving images captured by different image capturing apparatuses 100. In this case, the moving image selecting section 264 selects a moving image whose play back state in which the moving image is to be played back is required to be controlled, based on how each of the different image capturing apparatuses 100 is positioned relative to a subject indicated by the object which satisfies the condition. The play back state control section 262 controls the play back state in which the moving image selected by the moving image selecting section 264 is to be played back.

To be specific, the moving image selecting section 264 may select the moving image whose play back state in which the moving image is to be played back is required to be controlled, based on the distance between each of the different image capturing apparatuses 100 and the subject indicated by the object which satisfies the condition. Alternatively, the moving image selecting section 264 may select the moving image whose play back state in which the moving image is to be played back is required to be controlled, based on the image capturing direction of each of the different image capturing apparatuses 100 and the direction the subject indicated by the object satisfying the condition faces.

Figure 3:
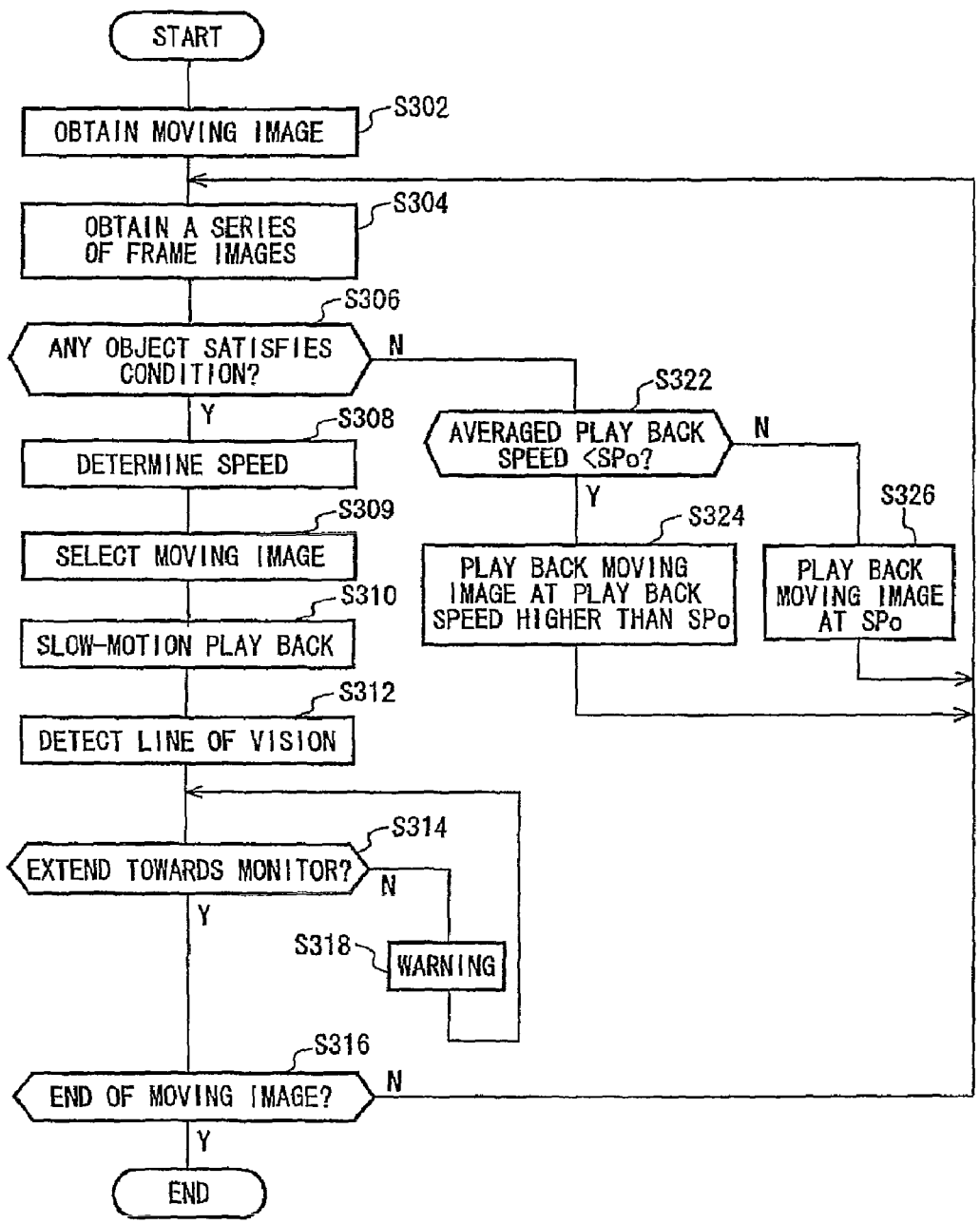
FIG. 3 illustrates an exemplary flow of operations performed by the output apparatus 170.

FIG. 3 illustrates an exemplary flow of operations performed by the output apparatus 170. The moving image obtaining section 200 obtains the moving image captured by each of the image capturing apparatuses 100 from the image capturing apparatus 100 (step S302). The moving image obtaining section 200 then extracts a series of frame images from the moving image obtained in the step S302 (step S304). For example, when the moving image obtained from each of the image capturing apparatuses 100 is coded in accordance with MPEG, the moving image obtaining section 200 extracts a plurality of successive pictures from an I picture to a picture immediately preceding the next I picture. Alternatively, the moving image obtaining section 200 may extract, as the series of frame images, a predetermined number of frame images making up a moving image of a predetermined duration or a plurality of frame images making up a moving image corresponding to one scene, which is determined based on the changes in the contents of the moving images.

Subsequently, the satisfaction judging section 220 judges whether there is a satisfying object which satisfies the condition stored on the condition storing section 210 in the series of frame images which are extracted in the step S304 (step S306). When the satisfaction judging section 220 judges positively in the step S306, the output control section 260 determines the play back speed at which the series of frame images are played back (step S308). For example, the output control section 260 decreases the play back speed as the number of people increases. The moving image selecting section 264 selects a moving image whose play back speed is required to be reduced from the plurality of moving images captured by the image capturing apparatuses 100 (step S309). The output section 270 then realizes the slow-motion play back of the series of frame images, included in the moving image selected in the step S309, at the play back speed determined in the step S308 (step S310).

After this, the line of vision detecting section 294 detects the line of vision of the observer 190 (step S312). The line of vision judging section 292 subsequently judges whether the line of vision of the observer 190 which is detected in the step S312 is directed towards the monitor which displays thereon the slow-motion play back of the moving image realized in the step S310 (step S314). When the line of vision judging section 292 judges negatively in the step S314, a warning is issued to encourage the observer 190 to watch the monitor (step S318), and the output apparatus 170 moves back to the operation in the step S314. Until the line of vision judging section 292 judges positively in the step S314, the play back of the moving image corresponding one scene which is realized in the step S310 is repeated.

When the line of vision judging section 292 judges positively in the step S314, the output apparatus 170 judges whether the entire moving image obtained in the step S302 has been played back (step S316). When judging positively, the output apparatus 170 ends the series of operations. When judging negatively, the output apparatus 170 moves back to the operation in the step S304.

Here, the averaged play back speed calculating section 280 calculates the averaged play back speed by averaging the play back speeds determined from when the output apparatus 170 starts playing back the moving image to date. When the satisfaction judging section 220 judges negatively in the step S306, the output control section 260 judges whether the averaged play back speed is lower than the specified play back speed SP0 (step S322). When the averaged play back speed is lower than the specified play back speed SP0, the output control section 260 causes the output section 270 to play back the moving image at a play back speed higher than the specified play back speed SP0 (step S324). When the averaged play back speed is equal to or higher than the specified play back speed SP0, the output control section 260 causes the output section 270 to display thereon the frame images at the specified play back speed SP0 (step S326). After this, the output apparatus 170 moves onto the operation in the step S304.

The above description is made assuming that the operations of the output apparatus 170 are sequentially performed for the sake of intelligibility. However, one or more of the above-described operations may be performed in parallel with one or more of the remaining operations. For example, the operation of obtaining the moving image in the step S302 and the operation of extracting the series of frame images in the step S304 can be performed in parallel with other operations. In addition, the operation of realizing the slow-motion play back in the step S310 can be performed in parallel with the operations in the steps S312, S314 and S318.

As described above, the output apparatus 170 slows down the play back speed of the moving image when a large number of people are included in the moving image. In this way, the output apparatus 170 allows the observer 190 to have an extra time to judge whether a suspicious individual is included among the people. When nobody is included in a moving image captured after the moving image that is played back at the decreased play back speed, the output apparatus 170 can increase the play back speed and play back the moving image at the increased play back speed in order to catch up with the scene which is expected to be played back if the moving image had been played back at the specified play back speed.

FIG. 4 illustrates, as an example, the condition stored on the condition storing section 210 by using a table. The condition storing section 210 stores thereon a plurality of conditions which are to be satisfied by an object required to be extracted, in terms of the shape, the colors, the position in the image, the direction the type, and the moving pattern. For example, the condition storing section 210 stores thereon n conditions (SHAPE 1 to SHAPE n) each of which designates the shape to be indicated by the outline of the object which is required to be extracted. For example, the condition storing section 210 stores thereon vector information which designates the shape to be indicated by the outline of the object which is required to be extracted. To be more specific, the condition storing section 210 may store thereon conditions each of which designates the shapes of the face, eyes, mouth, nose, and eyebrows and how they are positioned relative to each other.

Also, the condition storing section 210 stores thereon n conditions (COLOR RANGE 1 TO COLOR RANGE n) each of which sets colors which are required to be included in an object which is required to be extracted. For example, the condition storing section 210 may store thereon color ranges each of which indicates colors whose ratio in area is required to be equal to or higher than a predetermined ratio in the object which is required to be extracted. When an object has therein the colors included in one of the color ranges set by the condition storing section 210 at an area ratio equal to or higher than a predetermined area ratio, the satisfaction judging section 220 judges that the object satisfies the condition stored on the condition storing section 210.

Also, the condition storing section 210 stores thereon n conditions (POSITION RANGE 1 TO POSITION RANGE n) each of which sets the position at which an object required to be extracted is present. For example, the condition storing section 210 may store thereon position ranges each of which indicates the range of the position, in the image, within which the object required to be extracted moves. When an object is included in one of the position ranges, in the image, which are set by the condition storing section 210, the satisfaction judging section 220 judges that the object satisfies the condition set by the condition storing section 210.

Here, when an object different from a predetermined object is present in one of the position ranges set by the condition storing section 210, the satisfaction judging section 220 may judge that the condition set by the condition storing section 210 is satisfied. The predetermined object may be an object included in a background image. Also, when a moving object is present in one of the position ranges set by the condition storing section 210, the satisfaction judging section 220 may judge that the condition set by the condition storing section 210 is satisfied. Here, it is assumed that the output apparatus 170 obtains an MPEG moving image from each of the image capturing apparatuses 100. In this case, the satisfaction judging section 220 may judge that a moving object is present in one of the position ranges set by the condition storing section 210 when a block which has a larger motion vector than a predetermined value is contained in blocks included in one of the position ranges set by the condition storing section 210.

Also, the condition storing section 210 stores thereon n conditions (ANGLE RANGE 1 TO ANGLE RANGE n) each of which designates a range of directions in which an object which is required to be extracted moves. For example, the condition storing section 210 may store thereon angle ranges each of which is defined by an angle $\theta$ defined with respect to the coordinate axis in the image and a difference in angle $\Delta\theta$ from the angle $\theta$. In this case, when an object moves in a direction, in the image, which extends at an angle within a range from the angle $(\theta-\Delta\theta)$ to the angle $(\theta+\Delta\theta)$, the satisfaction judging section 220 may judge that the object satisfies the condition set by the condition storing section 210.

The condition storing section 210 may store thereon the combinations of the above-mentioned position range and angle range, as the conditions each of which designates the direction in which an object required to be extracted moves. For example, as the condition used to extract a person who makes a movement from a moving image of a room, the condition storing section 210 may store thereon an angle range including the angle at which the direction may extend from the entrance of the room to the monitored important region. In this way, the output apparatus 170 slows down the play back speed when detecting a person who moves from the entrance to the important region. As a result, the observer 190 can carefully monitor the person who makes the movement.

Also, the condition storing section 210 stores thereon n conditions (TYPE 1 TO TYPE n) each of which designates the type of an object which is required to be extracted. As the conditions each designating an object type, the condition storing section 210 may store thereon the combinations of the above-mentioned shape and color range.

Also, the condition storing section 210 stores thereon n conditions (MOVING PATTERN 1 to MOVING PATTERN n) each of which designates the pattern of the movement to be made by an object which is required to be extracted. Here, the moving pattern represents the characteristics or type of the movement made by the object. The moving pattern is described in more detail with reference to FIGS. 10 to 12.

As explained in the preceding section, the condition storing section 210 stores thereon the conditions each of which designates the range within which the object required to be extracted from the moving image is positioned. Here, the counting section 230 may count the number of the objects positioned within the range, designated by each condition, in the moving image obtained by the moving image obtaining section 200. Also, the condition storing section 210 stores thereon the conditions each of which designates the shape of the object required to be extracted from the moving image. Here, the counting section 230 may count the number of the objects, which have the shape designated by each condition, in the moving image obtained by the moving image obtaining section 200. In addition, the condition storing section 210 stores thereon the conditions each of which designates the color range of the colors included in the object required to be extracted from the moving image. Here, the counting section 230 may count the number of the objects, which have therein the colors included in the color range designated by each condition, in the moving image obtained by the moving image obtaining section 200. Furthermore, the condition storing section 210 stores thereon the conditions each of which designates the type of the object required to be extracted from the moving image. Here, the counting section 230 may count the number of the objects, which belong to the type designated by each condition, in the moving image obtained by the moving image obtaining section 200. Moreover, the condition storing section 210 stores thereon the conditions each of which designates the direction in which the object required to be extracted from the moving image moves. Here, the counting section 230 may count the number of the objects, which move in the direction designated by each condition, in the moving image obtained by the moving image obtaining section 200. Furthermore, the condition storing section 210 stores thereon the conditions each of which designates the characteristics of the movement made by the object which is required to be extracted from the moving image. Here, the counting section 230 may count the number of the objects, in the moving image obtained by the moving image obtaining section 200, which make the movement having the characteristics designated by each condition.

FIG. 5 illustrates, as an example, the play back speed information which is stored on the play back speed information storing section 250 by using a table. The play back speed information storing section 250 stores thereon play back speeds SP, in association with the number of the objects which satisfy the condition stored on the condition storing section 210 (SATISFYING OBJECT NUMBER 1, SATISFYING OBJECT NUMBER 2, . . . SATISFYING OBJECT NUMBER m) and the conditions stored on the condition storing section 210. The play back speed selecting section 240 selects the play back speed which is stored on the play back speed information storing section 250 in association with the satisfying object number which indicates the number of the objects satisfying the condition stored on the condition storing section 210, and the play back speed which is stored on the play back speed information storing section 250 in association with the satisfied condition.

The output control section 260 then causes the output section 270 to play back the moving image obtained by the moving image obtaining section 200 at the average or lowest play back speed among the plurality of play back speeds selected by the play back speed selecting section 240. According to the example shown in FIG. 5, the satisfying object numbers 1, 2, . . . m are defined as the satisfying object number 1>the satisfying object number 2> . . . >the satisfying object number m, and the SPs 1, 2, . . . m are defined as SP1>SP2> . . . >SPm. According to the example shown in FIG. 5, the play back speed information storing section 250 stores thereon the play back speeds. However, the information indicating the play back speeds which is stored on the play back speed information storing section 250 may include values indicating the play back speeds in a different format. For example, the play back speed information storing section 250 can store thereon a decrease in the play back speed.

Figure 6:
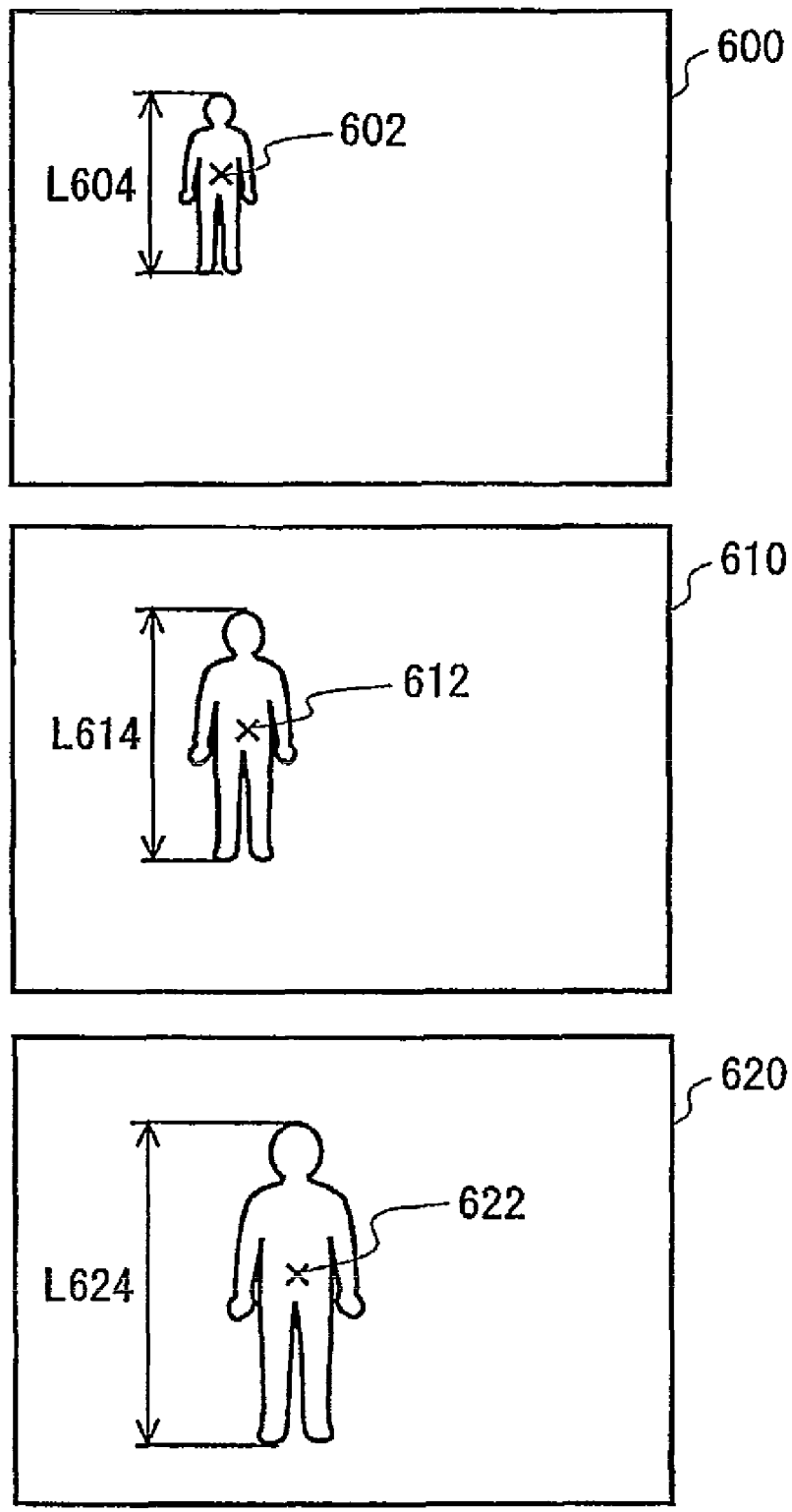
FIG. 6 illustrates, as an example, frame images including a subject moving towards an image capturing apparatus 100.

FIG. 6 illustrates, as an example, frame images 600, 610 and 620 which are included in a moving image showing a subject approaching towards one of the image capturing apparatuses 100. With reference to the frame images 600, 610 and 620, the following describes a method to judge whether an object is a satisfying object which moves in a direction extending towards one of the image capturing apparatuses 100.

The satisfaction judging section 220 extracts a moving object from each of the frame images 600, 610 and 620 captured by one of the image capturing apparatuses 100. The satisfaction judging section 220 subsequently identifies the direction in which the position of the barycenter (602, 612 and 622) of the moving object moves between the frame images 600, 610 and 620. The satisfaction judging section 220 then judges whether the identified moving direction of the position of the barycenter matches a direction stored on the condition storing section 210.

For example, the condition storing section 210 stores thereon a condition which designates the direction towards the center in the image. When the identified moving direction of the position of the barycenter matches the direction towards the center in the image, the satisfaction judging section 220 judges that the condition stored on the condition storing section 210 is satisfied. In addition to the condition which designates the direction towards the center in the image, the condition storing section 210 may store thereon a condition which is related to a change in the size of the object, as the conditions to be satisfied by the object required to be extracted from the moving image. For example, the condition storing section 210 may store thereon a condition which is used to judge whether the increasing rate of the length of the object is higher than a predetermined increasing rate.

The satisfaction judging section 220 calculates the increasing rate of the length (L604, L614 and L624) of the moving object. For example, the satisfaction judging section 220 calculates the value of (the length L606−the length L604)/Δt as the increasing rate of the length of the object between the frame images 600 and 610, where Δt denotes the interval at which each image capturing apparatus 100 capture frame images. When the increasing rate of the length of a given object is higher than a predetermined increasing rate and the moving direction of the position of the barycenter of the given object matches the direction towards the center in the image, the satisfaction judging section 220 judges that the given object satisfies the conditions stored on the condition storing section 210.

In place of the condition which designates the direction towards the center in the image, the condition storing section 210 may store thereon a condition which is used to judge whether the barycenter of the object is positioned in the vicinity of the center in the image. If such is the case, when the increasing rate of the length of a given object is higher than a predetermined increasing rate and the barycenter of the given object is positioned in substantially the center of the image, the satisfaction judging section 220 judges that the given object satisfies the conditions stored on the condition storing section 210.

When detecting a subject moving towards the image capturing apparatus 100 in the above-described manner, the output apparatus 170 can slow down the play back speed for the moving image output therefrom. With such a configuration, when the image capturing apparatus 100 is provided on a thing to be protected against theft, for example, the output apparatus 170 can precisely detect a person who approaches towards the thing and enables the observer 190 to carefully check the person. Also, the output apparatus 170 can accurately detect a person who attempts to obstruct the operations of the image capturing apparatus 100, for example, by covering the image capturing apparatus 100 with cloth.

Figure 7:
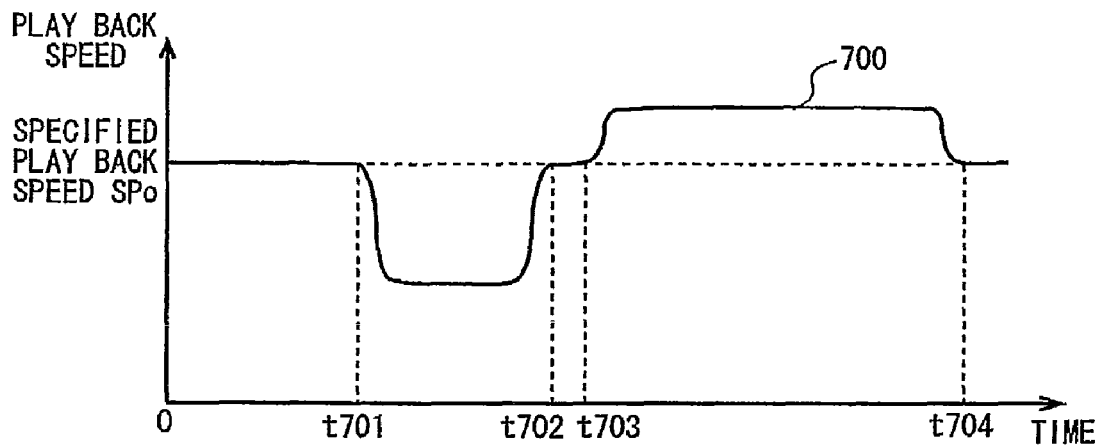
FIG. 7 illustrates, as an example, the variation over time in the play back speed at which an output section 270 plays back moving images.

FIG. 7 illustrates, as an example, the variation over time in the play back speed at which the moving image is played back by the output section 270. The output section 270 starts playing back the moving image obtained by the moving image obtaining section 200 at the time 0. At the beginning, the output control section 260 causes the output section 270 to play back the moving image at the speed SP0. As the number of people included in the moving image increases during the period from the time t701 to the time t702, the output control section 260 decreases the play back speed at which the output section 270 plays back the moving image. Therefore, the time period during which the output apparatus 170 plays back the moving image becomes longer than the time period during which the image capturing apparatus 100 captures the same moving image. Here, the averaged play back speed which is calculated by the averaged play back speed calculating section 280 becomes lower than the speed SP0.

If such occurs, the output control section 260 causes the output section 270 to play back the moving image at a play back speed higher than the speed SP0, so that the averaged play back speed calculated by the averaged play back speed calculating section 280 moves towards the speed SP0, after the time t703 which is positioned a predetermined time later than the time t702 at which the people become no longer detected. After the time t704 at which the averaged play back speed calculated by the averaged play back speed calculating section 280 becomes substantially equal to the speed SP0, the output control section 260 causes the output section 270 to play back the moving image at the speed SP0. By performing the above-described control, the output control section 260 can cause the time period during which the output section 270 plays back the moving image to become substantially equal to the time period during which the image capturing apparatus 100 captures the same moving image.

Figure 8:
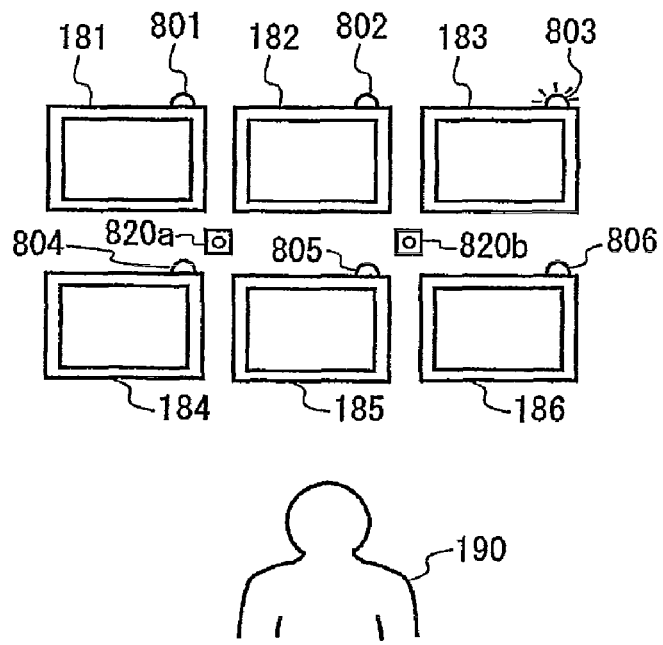
FIG. 8 illustrates, as an example, how monitors 181 to 186, line of vision detecting cameras 820, and warning lights 801 and 806 are positioned relative to each other.

FIG. 8 illustrates, as an example, how the monitors 181 to 186, line of vision detecting cameras 820, and warning lights 801 to 806 are arranged. The warning lights 801 to 806 are shown as an example of the warning section 290. The line of vision detecting cameras 820a and 820b (hereinafter collectively referred to as the line of vision detecting cameras 820) constitute part of the line of vision detecting section 294. For example, the line of vision detecting section 294 detects the direction in which the line of vision of the observer 190 extends, based on the face images obtained by the line of vision detecting cameras 820 which capture images of the face of the observer 190 who watches the monitors 181 to 186.

There are a plurality of line of vision detecting cameras 820 in order to capture images of the face of the observer 190 from a plurality of different directions. The warning lights 801 to 806 are respectively provided at the monitors 181 to 186. When the line of vision of the observer 190 does not extend towards the monitor 183 which displays thereon the moving image at a play back speed lower than the speed SP0, the warning light 803 is illuminated. Therefore, the observer 190 can be informed to pay attention to the monitor 183 which plays back the moving image at a low play back speed.

Here, the line of vision detecting section 294 identifies the direction the face of the observer 190 faces based on the parallax image information (for example, a three-dimensional image) obtained from the face images of the observer 190 which are captured by the line of vision detecting cameras 820a and 820b. Also, the line of vision detecting section 294 calculates the direction in which the line of vision of the observer 190 extends with respect to the face direction, based on the positions of the eye balls in the three-dimensional image. For example, the line of vision detecting section 294 calculates the direction in which the line of vision extends with respect to the face direction, based on the difference in position between the center of the dark region (for example, the black region) within the eye ball region and the center of the eye ball region. Here, the direction in which the line of vision extends with respect to the face direction may be determined in advance in association with the difference in position between the center of the dark region within the eye ball region and the center of the eye ball region. Based on the direction the face of the observer 190 faces and the direction in which the line of vision of the observer 190 extends with respect to the face direction, the line of vision detecting section 294 detects the direction in which the line of vision of the observer 190 extends.

The line of vision judging section 292 identifies how the line of vision detecting cameras 820 are positioned relative to the observer 190, based on the focus control performed by the line of vision detecting cameras 820a and 820b or a result of measurement performed by a distance measuring apparatus which is separately provided. The line of vision judging section 292 then judges whether the line of vision of the observer 190 extends towards any of the monitors 181 to 186, based on the positions of the line of vision detecting cameras 820a and 820b, the positions of the monitors 181 to 186, the positional relation between the observer 190 and the line of vision detecting cameras 820, and the direction in which the line of vision of the observer 190 extends which is detected by the line of vision detecting section 294. In more detail, the line of vision judging section 292 judges whether the line of vision of the observer 190 extends towards the monitor 183 which is caused by the output control section 260 to play back the moving image at a lower play back speed. When the line of vision judging section 292 judges negatively, the warning light 803 provided on the monitor 183 is illuminated. As described above, the output apparatus 170 can encourage the observer 190 to pay attention to the monitor which displays thereon the moving image at a lower play back speed.

When the line of vision judging section 292 judges that the line of vision of the observer 190 does not extend towards the monitor 183 which is caused by the output control section 260 to play back the moving image at a lower play back speed, the behavior judging section 298 judges that the observer 190 does not observe the moving images displayed on the monitors 181 to 186. If this is the case, the output control section 260 causes a storing device or the like to retain the moving images that are displayed on the monitors 181 to 186 during the period in which the observer 190 does not observe the moving images. The output control section 260 causes the monitors 181 to 186 to play back again the retained moving images. Here, the output control section 260 may cause the monitors 181 to 186 to play back again the retained moving images during such a period that an object satisfying the condition stored on the condition storing section 210 is not detected. The output control section 260 may cause the monitors 181 to 186 to repeatedly play back the retained moving images until the behavior judging section 298 judges that the observer 190 observes the moving images displayed on the monitors 181 to 186.

When the behavior judging section 298 judges that the observer 190 does not observe the moving images displayed on the monitors 181 to 186, the output control section 260 may attach additional information, indicating that the observer 190 does not observe the moving images, to the moving images that are displayed on the monitors 181 to 186 during the period in which the observer 190 does not observe the moving images, and cause the storing device or the like to retain the resulting moving images. The output control section 260 may cause the monitors 181 to 186 to play back again the moving images to which the additional information indicating that the observer 190 does not observe the moving images is attached.

Figure 9:
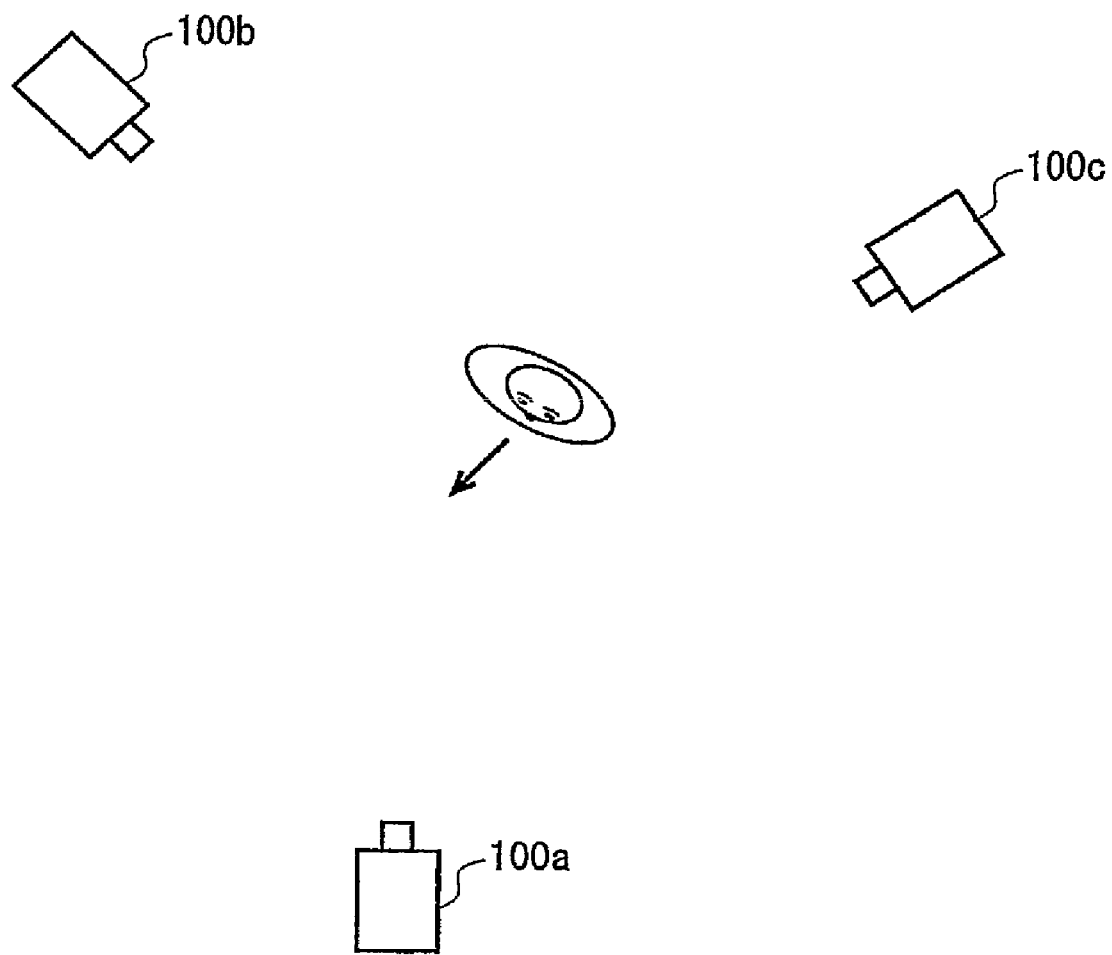
FIG. 9 illustrates, as an example, how image capturing apparatuses 100 are positioned relative to a subject.

FIG. 9 illustrates, as an example, how the image capturing apparatuses 100 are positioned relative to a subject. The image capturing apparatuses 100 transmit, to the output apparatus 170, the image capturing directions in which the image capturing apparatuses 100 captures images. The moving image selecting section 264 calculates the angle formed between the image capturing direction of each of the image capturing apparatuses 100 and the moving direction in which the subject indicated by the object moves, based on the image capturing directions received from the image capturing apparatuses 100 and the moving direction in which the subject indicated by the object moves. When selecting a moving image whose play back speed is required to be changed, the moving image selecting section 264 gives priority to a moving image captured by one of the image capturing apparatuses 100 which is associated with a relatively large angle. According to the exemplary case shown in FIG. 9, the moving image selecting section 264 selects, as the moving image whose play back speed is required to be changed, the moving image captured by the image capturing apparatus 100a. Note that the moving direction in which the subject indicated by the object moves can be calculated based on the moving direction of the object included in the moving-image making-up images captured by each of the image capturing apparatuses 100a to 100c.

In addition, the moving image selecting section 264 calculates the angle formed between the image capturing direction of each of the image capturing apparatuses 100 and the direction the face of the person indicated by the object faces, based on the image capturing directions received from the image capturing apparatuses 100 and the direction the face of the person indicated by the object faces. When selecting the moving image whose play back speed is required to be changed, the moving image selecting section 264 may give priority to a moving image captured by one of the image capturing apparatuses 100 which is associated with a relatively large angle.

Also, the image capturing apparatuses 100 transmit, to the output apparatus 170, the positions of the image capturing apparatuses 100 and image capturing conditions. The moving image selecting section 264 calculates the distance between each of the image capturing apparatuses 100 and the subject indicated by the object, based on the positions of the image capturing apparatuses 100 which are received from the image capturing apparatuses 100 and what is shown by the object. When selecting the moving image whose play back speed is required to be changed, the moving image selecting section 264 may give priority to a moving image captured by one of the image capturing apparatuses 100 which is associated with a relatively short distance.

The moving image selecting section 264 may calculate, for each of the image capturing apparatuses 100, an indicator value representing the above-mentioned angle formed between the image capturing direction and the subject, an indicator value representing the angle formed between the image capturing direction and the direction the face of the person faces, and an indicator value representing the distance between the image capturing apparatus 100 and the subject indicated by the object. Here, the indicator values increase as the above-mentioned angles increase and as the distance decreases. The moving image selecting section 264 then calculates a sum value, for each of the image capturing apparatuses 100, by adding together the weighted indicator values. When selecting the moving image whose play back speed is required to be changed, the moving image selecting section 264 may give priority to a moving image captured by one of the image capturing apparatuses 100 which is associated with a relatively large sum value.

Figure 11:
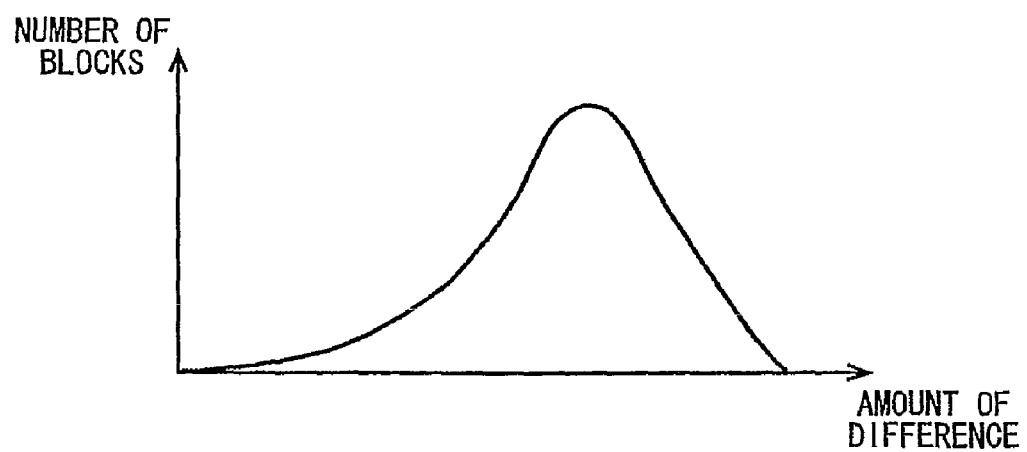
FIG. 11 illustrates an exemplary histogram showing the amount of a change in an object, which satisfies the condition stored on the condition storing section 210.
Figure 12:
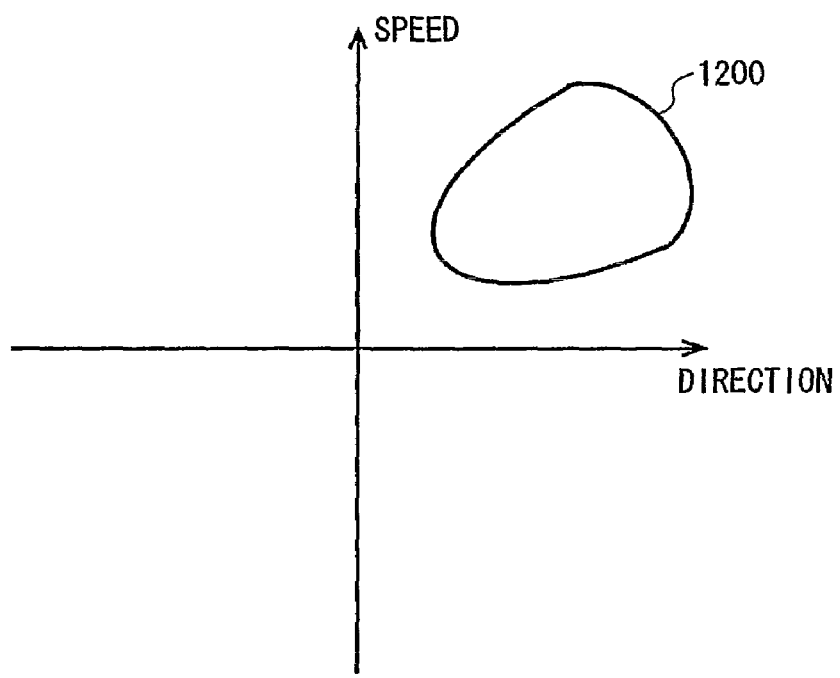
FIG. 12 illustrates, as an example, a normal behavior region indicating a normal behavior, which is set within a space defined by a moving direction and a moving speed.

The following describes an example of the condition designating the moving pattern which is stored on the condition storing section 210, with reference to FIGS. 10 to 12. FIG. 10 illustrates, as an example, variations over time in the object moving speed, which satisfy the condition stored on the condition storing section 210. The lines 1010 and 1020 in FIG. 10 represent, as an example, the variations over time in the moving speed, which satisfy the condition stored on the condition storing section 210. For example, when a stationary object starts moving, that is to say, when something placed at a certain position is taken away, the variation over time in the moving speed is represented by the line 1010. Alternatively, when a moving object stops moving, that is to say, when something is left at a certain position, the variation over time in the moving speed is represented by the line 1020.

In order that such an object can be extracted, the condition storing section 210 may store thereon a condition which is used to judge whether the moving speed varies in a discontinuous manner. For example, the condition storing section 210 stores thereon a condition which is used to judge whether the change in the moving speed is larger than a predetermined value. Here, the moving speed can be detected based on the change in the position of the object included in the moving-image making-up images or motion vector information included in the moving image.

FIG. 11 illustrates, as an example, a histogram showing the amount of a change in an object, which satisfies the condition stored on the condition storing section 210. Here, the amount of a change in an object may be, for example, the amount of a change in the pixel value of the object or the amount of a change in the shape of the object. The amount of a change in an object can be represented, for example, by the amount of a difference in the image of the object. As an example, FIG. 11 shows a histogram associating the number of partial regions (for example, macro blocks or blocks) included in the object, with the amount of a difference in a luminance value of the object. Here, the partial regions are defined in the moving-image making-up images. For example, when the moving image shows a violent movement, such as a person running or people fighting each other, the histogram shown in FIG. 11 is obtained which peaks at a relatively large amount of a difference.

In order that such an object can be extracted, the condition storing section 210 may store thereon a condition which is used to judge whether a peak value of a histogram for the amount of a change in an object is larger than a predetermined value. Here, the amount of a difference mentioned here may be, for example, a difference component in a luminance value or a difference component in color difference information, which is observed after the movement included in the moving image is compensated. The amount of a change in an object can be represented by a variety of pieces of information included in a coded moving image, such as the direction and magnitude of a motion vector.

FIG. 12 illustrates, as an example, a normal behavior region indicating a normal behavior, which is set within a space defined by a moving direction and a moving speed. Here, a moving direction component and a moving speed component within the region enclosed by a line 1200 indicate the movement made by a person who normally behaves. Therefore, a person who makes a movement that is indicated by a moving direction component and a moving speed component outside the region enclosed by the line 1200 can be judged to behave abnormally. In order that a person who behaves abnormally can be extracted, the condition storing section 210 may store thereon a condition which is used to judge whether the moving direction component and the moving speed component are positioned in a predetermined region, within the space defined by the moving direction and speed, which is outside the region enclosed by the line 1200.

Here, the information indicating the normal behavior region or predetermined region may be accumulated through learning. The above description is made by using a two-dimensional space defined by a speed and a direction as an example to avoid complexity. However, the condition storing section 210 can store thereon a condition which is associated with a multi-dimensional space, i.e. three-or-higher-dimensional space, defined by diverse indicators, which includes the amount of a change in the moving speed and the amount of a change in an object which are described with reference to FIGS. 10 and 11.

According to the above description, the output apparatus 170 obtains the moving image captured by each of the image capturing apparatuses 100, and outputs the moving image. According to a different embodiment, however, the output apparatus 170 may itself have the image capturing function of the image capturing apparatuses 100. For example, the moving image obtaining section 200 may be alternatively configured as an image capturing section that captures a moving image of a monitored area. According to the present embodiment, the moving-image making-up images may be frame images or field images.

Figure 13:
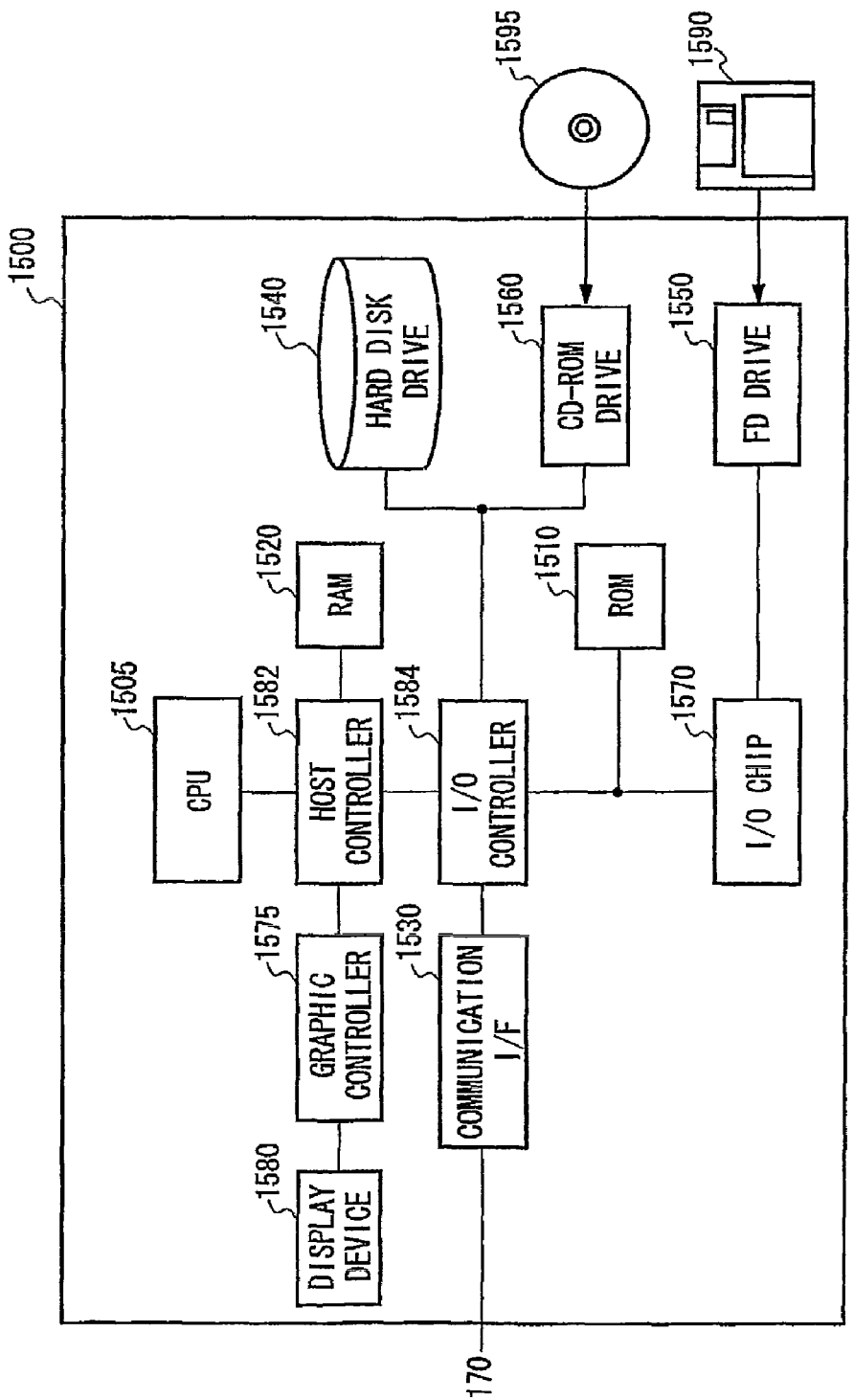
FIG. 13 illustrates an exemplary hardware configuration of a computer 1500 relating to the output apparatus 170.

FIG. 13 illustrates an exemplary hardware configuration of a computer 1500 relating to the output apparatus 170. The computer 1500 is constituted by a CPU surrounding section, an input/output (I/O) section and a legacy I/O section. The CPU surrounding section includes a CPU 1505, a RAM 1520, a graphic controller 1575, and a display device 1580 which are connected to each other by means of a host controller 1582. The I/O section includes a communication interface 1530, a hard disk drive 1540, and a CD-ROM drive 1560 which are connected to the host controller 1582 by means of an I/O controller 1584. The legacy I/O section includes a ROM 1510, a flexible disk drive 1550, and an I/O chip 1570 which are connected to the I/O controller 1584.

The host controller 1582 connects the RAM 1520 with the CPU 1505 and graphic controller 1575 which access the RAM 1520 at a high transfer rate. The CPU 1505 operates in accordance with programs stored on the ROM 1510 and RAM 1520, to control the constituents. The graphic controller 1575 obtains image data which is generated by the CPU 1505 or the like on a frame buffer provided within the RAM 1520, and causes the display device 1580 to display the obtained image data. Alternatively, the graphic controller 1575 may include therein a frame buffer for storing thereon image data generated by the CPU 1505 or the like.

The I/O controller 1584 connects, to the host controller 1582, the hard disk drive 1540, communication interface 1530 and CD-ROM drive 1560 which are I/O devices operating at a relatively high rate. The hard disk drive 1540 stores thereon programs and data to be used by the CPU 1505 provided in the computer 1500. The communication interface 1530 communicates with the output apparatus 170 via a network, to provide programs and data to the output apparatus 170. The CD-ROM drive 1560 reads programs or data from a CD-ROM 1595, and supplies the read programs or data to the hard disk drive 1540 and communication interface 1530 via the RAM 1520.

The I/O controller 1584 is also connected to the ROM 1510, flexible disk drive 1550 and I/O chip 1570 which are I/O devices operating at a relatively low rate. The ROM 1510 stores thereon a boot program executed by the computer 1500 at the start up, programs unique to the hardware of the computer 1500, and the like. The flexible disk drive 1550 reads programs or data from a flexible disk 1590, and supplies the read programs or data to the hard disk drive 1540 and communication interface 1530 via the RAM 1520. The I/O chip 1570 is used to connect a variety of I/O devices such as the flexible disk drive 1550 via, for example, a parallel port, a serial port, a keyboard port, a mouse port or the like.

A program to be supplied to the communication interface 1530 via the RAM 1520 is provided by a user in a state of being stored on a recording medium such as the flexible disk 1590, CD-ROM 1595 and an IC card. The program is read from the recording medium, provided to the communication interface 1530 via the RAM 1520, and transmitted to the output apparatus 170 via the network. The program transmitted to the output apparatus 170 is installed in and executed by the output apparatus 170.

The program to be installed in and then executed by the output apparatus 170 causes the output apparatus 170 to function as the moving image obtaining section 200, condition storing section 210, satisfaction judging section 220, counting section 230, play back speed selecting section 240, play back speed information storing section 250, output control section 260, output section 270, averaged play back speed calculating section 280, warning section 290, behavior detecting section 296, and behavior judging section 296, described with reference to FIGS. 1 to 12.

The program mentioned above may be stored on an external recording medium. The recording medium is, for example, an optical recording medium such as DVD and PD, a magnet-optical recording medium such as MD, a tape medium, a semiconductor memory such as an IC card and the like, in addition to the flexible disk 1590 and CD-ROM 1595. The recording medium may be a storage device such as a hard disk and RAM which is provided in a server system connected to a dedicated communication network or the Internet, and the program may be provided to the computer 1500 via the network.

While the embodiment of the present invention has been described, the technical scope of the invention is not limited to the above described embodiment. It is apparent to persons skilled in the art that various alterations and improvements can be added to the above-described embodiment. It is also apparent from the scope of the claims that the embodiments added with such alternations or improvements can be included in the technical scope of the invention.

The invention claimed is:

1. An output apparatus comprising:
a moving image obtaining section that obtains a moving image;

an output section that outputs the moving image obtained by the moving image obtaining section;

a condition storing section that stores thereon a condition to be satisfied by an object which is required to be extracted from a moving image; and an output control section that, when an object satisfying the condition is extracted from the moving image obtained by the moving image obtaining section, controls the moving image obtained by the moving image obtaining section in terms of a play back state in which the moving image is to be played back, and causes the output section to output the controlled moving image, further comprising a counting section that counts the number of objects, in the moving image obtained by the moving image obtaining section, which satisfy the condition, wherein the output control section converts the moving image obtained by the moving image obtaining section into a different moving image in such a manner that a play back speed at which the different moving image is to be played back decreases as the number of objects which is counted by the counting section increases, and causes the output section to output the different moving image generated as a result of the conversion.

2. The output apparatus as set forth in claim 1, further comprising:

a play back speed information storing section that stores thereon play back speeds in association with the numbers of objects; and a play back speed selecting section that selects a play back speed which is stored on the play back speed information storing section in association with the number of objects which is counted by the counting section, wherein the output control section converts the moving image obtained by the moving image obtaining section into a moving image which is to be played back at the play back speed selected by the play back speed selecting section, and causes the output section to output the moving image generated as a result of the conversion.

3. The output apparatus as set forth in claim 1, wherein the condition storing section stores thereon a condition which designates a range in which the object required to be extracted from the moving image is positioned, and the counting section counts the number of objects, in the moving image obtained by the moving image obtaining section, which are positioned within the range designated by the condition.

4. The output apparatus as set forth in claim 1, wherein the condition storing section stores thereon a condition which designates a shape of the object required to be extracted from the moving image, and the counting section counts the number of objects, in the moving image obtained by the moving image obtaining section, which have the shape designated by the condition.

5. The output apparatus as set forth in claim 1, wherein the condition storing section stores thereon a condition which designates a type to which the object required to be extracted from the moving image belong, and the counting section counts the number of objects, in the moving image obtained by the moving image obtaining section, which belong to the type designated by the condition.

6. The output apparatus as set forth in claim 1, wherein the condition storing section stores thereon a condition which designates a moving direction in which the object required to be extracted from the moving image moves, and the counting section counts the number of objects, in the moving image obtained by the moving image obtaining section, which move in the moving direction designated by the condition.

7. The output apparatus as set forth in claim 6, wherein the moving image obtaining section obtains a moving image which is captured by an image capturing apparatus, the condition storing section stores thereon a condition which designates a moving direction towards the image capturing apparatus, and the counting section counts the number of objects, in the moving image obtained by the moving image obtaining section, which move in the moving direction designated by the condition.

8. The output apparatus as set forth in claim 1, wherein the output section displays thereon the moving image obtained by the moving image obtaining section, and after causing the output section to display thereon the moving image obtained by the moving image obtaining section at a play back speed lower than a specified play back speed which is specified for the moving image obtained by the moving image obtaining section, the output control section converts a moving image captured during a period in which the number of objects counted by the counting section is smaller than a predetermined number into a moving image which is to be played back at a play back speed higher than the specified play back speed and causes the output section to output the moving image generated as a result of the conversion, so that an averaged play back speed from when the output section is caused to start displaying thereon the moving image obtained by the moving image obtaining section becomes substantially equal to the specified play hack speed.

9. The output apparatus as set forth in claim 1, further comprising a behavior detecting section that detects a behavior of an observer which is required to observe the moving image obtained by the moving image obtaining section, wherein the output section displays the moving image obtained by the moving image obtaining section, and the output control section further controls the display of the moving image which is achieved by the output section based on the behavior of the observer which is detected by the behavior detecting section.

10. The output apparatus as set forth in claim 9, further comprising a behavior judging section that judges whether the observer observes the moving image displayed by the output section based on the behavior of the observer which is detected by the behavior detecting section, wherein the output control section controls the display of the moving image which is achieved by the output section based on the judgment made by the behavior judging section.

11. The output apparatus as set forth in claim 10, wherein the output control section causes the output section to display the moving image again, when the judgment made by the behavior judging section indicates that the observer does not observe the moving image displayed on the output section.

12. The output apparatus as set forth in claim 11, wherein the behavior detecting section includes:
a line of vision detecting section that detects a line of vision of the observer; and
a line of vision judging section that judges whether the line of vision which is detected by the line of vision detecting section extends towards the output section, and
the behavior judging section judges that the observer does not observe the moving image displayed by the output section, when the line of vision judging section judges that the line of vision which is detected by the line of vision detecting section does not extend towards the output section.

13. The output apparatus as set forth in claim 9, further comprising:
a behavior judging section that judges whether the observer observes the moving image displayed by the output section based on the behavior of the observer which is detected by the behavior detecting section; and
a warning section that issues a warning to the observer when the judgment made by the behavior judging section indicates that the observer does not observe the moving image displayed by the output section.

14. The output apparatus as set forth in claim 13, wherein the behavior detecting section includes:
a line of vision detecting section that detects a line of vision of the observer; and
a line of vision judging section that judges whether the line of vision which is detected by the line of vision detecting section extends towards the output section, and
when the line of vision judging section judges that the line of vision which is detected by the line of vision detecting section does not extend towards the output section, the behavior judging section judges that the observer does not observe the moving image displayed by the output section.

15. The output apparatus as set forth in claim 1, wherein the moving image obtaining section obtains a plurality of moving images captured by different image capturing apparatuses,
the output control section includes:
a moving image selecting section that selects a moving image which is required to be controlled in terms of a play back state in which the moving image is to be played back, based on how each of the different image capturing apparatuses is positioned relative to a subject indicated by the object satisfying the condition; and
a play back state control section that controls the moving image selected by the moving image selecting section in terms of the play back state in which the moving image is to be played back.

16. The output apparatus as set forth in claim 15, wherein the moving image selecting section selects the moving image which is required to be controlled in terms of the play back state in which the moving image is to be played back, based on a distance between each of the different image capturing apparatuses and the subject indicated by the object satisfying the condition.

17. The output apparatus as set forth in claim 15, wherein the moving image selecting section selects the moving image which is required to be controlled in terms of the play back state in which the moving image is to be played hack, based on an image capturing direction of each of the different image capturing apparatuses and a direction the subject indicated by the object satisfying the condition faces.

18. An output apparatus comprising:
a moving image obtaining section that obtains a moving image;
an output section that outputs the moving image obtained by the moving image obtaining section;
a condition storing section that stores thereon a condition to be satisfied by an object which is required to be extracted from a moving image; and
an output control section that, when an object satisfying the condition is extracted from the moving image obtained by the moving image obtaining section, controls the moving image obtained by the moving image obtaining section in terms of a play hack state in which the moving image is to be played back, and causes the output section to output the controlled moving image,
wherein
the condition storing section stores thereon a condition which is related to a movement of the object required to be extracted from the moving image, and
when an object satisfying the condition related to the movement is extracted from the moving image obtained by the moving image obtaining section, the output control section controls the moving image obtained by the moving image obtaining section in terms of the play back state in which the moving image is to be played back, and causes the output section to output the controlled moving image, and
wherein
the condition storing section stores thereon a condition which designates a direction in which the object required to be extracted from the moving image moves,
the output apparatus further comprises
a satisfaction judging section that judges whether an object which moves in the direction designated by the condition is present in the moving image obtained by the moving image obtaining section; and
when the satisfaction judging section judges positively, the output control section converts the moving image obtained by the moving image obtaining section into a moving image which is to be played back at a lower play back speed than when the satisfaction judging section judges negatively, and causes the output section to output the moving image generated as a result of the conversion.

19. The output apparatus as set forth in claim 18, further comprising:
a play back speed information storing section that stores thereon a play back speed in association with the direction designated by the condition; and
a play back speed selecting section that, when the satisfaction judging section judges positively, selects the play back speed which is stored on the play back speed information storing section in association with the direction designated by the condition, wherein
the output control section converts the moving image obtained by the moving image obtaining section into a moving image which is to be played back at the play back speed which is selected by the play back speed selecting section, and causes the output section to output the moving image generated as a result of the conversion.

20. The output apparatus as set forth in claim 18, wherein the output section displays thereon the moving image obtained by the moving image obtained section, and
after causing the output section to display thereon the moving image obtained by the moving image obtaining section at a play back speed lower than a specified play hack speed which is specified for the moving image obtained by the moving image obtaining section, the output control section converts a moving image captured during a period in which the satisfaction judging section judges negatively into a different moving image which is to be played back at a play back speed higher than the specified play back speed, and causes the output section to output the different moving image generated as a result of the conversion, so that an averaged play back speed from when the output section is caused to start displaying thereon the moving image obtained by the moving image obtaining section becomes substantially equal to the specified play back speed.

21. An output apparatus comprising:
a moving image obtaining section that obtains a moving image;
an output section that outputs the moving image obtained by the moving image obtaining section;
a condition storing section that stores thereon a condition to be satisfied by an object which is required to be extracted from a moving image; and
an output control section that, when an object satisfying the condition is extracted from the moving image obtained by the moving image obtaining section, controls the moving image obtained by the moving image obtaining section in terms of a play back state in which the moving image is to be played back, and causes the output section to output the controlled moving image,
wherein
the condition storing section stores thereon a condition which designates a type to which the object required to be extracted from the moving image belongs,
the output apparatus further comprises
a play back speed information storing section that stores thereon a play back speed in association with the type which is designated by the condition; and
a satisfaction judging section that judges whether an object belonging to the type designated by the condition is present in the moving image obtained by the moving image obtaining section, and
when the satisfaction judging section judges positively, the output control section converts the moving image obtained by the moving image obtaining section into a moving image which is to be played back at a play back speed determined in accordance with the play back speed stored on the play back speed information storing section in association with the type designated by the condition, and causes the output section to output the moving image generated as a result of the conversion.

22. The output apparatus as set forth in claim 21, wherein the condition storing section stores thereon a plurality of conditions which respectively designate a plurality of types to which objects required to be extracted from a moving image belong,
the play back speed information storing section stores thereon a plurality of play back speeds in association with the plurality of types which are designated by the plurality of conditions, and
when the satisfaction judging section judges that objects belonging to the plurality of types designated by the plurality of conditions are present in the moving image obtained by the moving image obtaining section, the output control section converts the moving image obtained by the moving image obtaining section into a moving image which is to be played back at an average play back speed among the plurality of play back speeds which are stored on the play back speed information storing section in association with the plurality of types designated by the plurality of conditions, and causes the output section to output the moving image generated as a result of the conversion.

23. The output apparatus as set forth in claim 21, wherein the condition storing section stores thereon a plurality of conditions which respectively designate a plurality of types to which objects required to be extracted from a moving image belong,
the play back speed information storing section stores thereon a plurality of play back speeds in association with the plurality of types designated by the plurality of conditions, and
when the satisfaction judging section judges that objects belonging to the plurality of types designated by the plurality of conditions are present in the moving image obtained by the moving image obtaining section, the output control section converts the moving image obtained by the moving image obtaining section into a moving image which is to be played back at the lowest play back speed among the plurality of play back speeds which are stored on the play back speed information storing section in association with the plurality of types designated by the plurality of conditions, and causes the output section to output the moving image generated as a result of the conversion.

24. The output apparatus as set forth in claim 21, wherein the output section displays thereon the moving image obtained by the moving image obtaining section, and
after causing the output section to display thereon the moving image obtained by the moving image obtaining section at a play back speed lower than a specified play back speed which is specified for the moving image obtained by the moving image obtaining section, the output control section converts a moving image captured during a period in which the satisfaction judging section judges negatively into a different moving image which is to be played back at a play back speed higher than the specified play hack speed, and causes the output section to output the different moving image generated as a result of the conversion, so that an averaged play back speed from when the output section is caused to start displaying thereon the moving image obtained by the moving image obtaining section becomes substantially equal to the specified play back speed.

* * * * *